US012658524B2

(12) United States Patent
Zhang

(10) Patent No.: US 12,658,524 B2
(45) Date of Patent: Jun. 16, 2026

(54) ENERGY STORAGE DEVICE

(71) Applicant: CONTEMPORARY AMPEREX TECHNOLOGY (HONG KONG) LIMITED, Hong Kong (CN)

(72) Inventor: Mingliang Zhang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 19/254,049

(22) Filed: Jun. 30, 2025

(65) Prior Publication Data

US 2025/0329866 A1      Oct. 23, 2025

Related U.S. Application Data

(63) Continuation of application No. PCT/CN2024/074239, filed on Jan. 26, 2024.

(30) Foreign Application Priority Data

Mar. 31, 2023    (CN) ......................... 202310340880.6

(51) Int. Cl.
| | |
|---|---|
| *H01M 50/204* | (2021.01) |
| *B65D 77/22* | (2006.01) |
| *B65D 90/32* | (2006.01) |
| *B65D 90/34* | (2006.01) |
| *H01M 50/262* | (2021.01) |

(Continued)

(52) U.S. Cl.
CPC ...... *H01M 50/3425* (2021.01); *B65D 77/225* (2013.01); *B65D 90/325* (2013.01); *B65D 90/34* (2013.01); *H01M 50/262* (2021.01);

*H01M 50/271* (2021.01); *H01M 50/383* (2021.01); *B65D 2205/00* (2013.01); *H01M 50/204* (2021.01)

(58) Field of Classification Search
CPC ........... H01M 50/3425; H01M 50/204; B65D 90/34; B65D 77/225; B65D 90/325; B65D 2205/00
See application file for complete search history.

(56) References Cited

U.S. PATENT DOCUMENTS

| | | | | |
|---|---|---|---|---|
| 4,404,982 A * | 9/1983 | Ou | ......................... | F16K 17/162 |
| | | | | 220/89.2 |
| 6,210,825 B1 * | 4/2001 | Takada | .............. | H01M 50/3425 |
| | | | | 429/56 |
| 2021/0210817 A1 | 7/2021 | Liu | | |

FOREIGN PATENT DOCUMENTS

| | | |
|---|---|---|
| CN | 200993972 Y | 12/2007 |
| CN | 201112458 Y | 9/2008 |

(Continued)

OTHER PUBLICATIONS

International Search Report for PCT /CN2023/120698 mailed Nov. 9, 2023.

(Continued)

*Primary Examiner* — Stephen J Castellano
(74) *Attorney, Agent, or Firm* — Ladas & Parry, LLP

(57) ABSTRACT

Disclosed in embodiments of the present application is an energy storage device. The energy storage device is used for storing a plurality of batteries, and comprises: a first wall; and a pressure relief assembly arranged on the first wall. Therefore, according to the energy storage device of the embodiments, the reliability of the energy storage device can be improved.

17 Claims, 9 Drawing Sheets

(51) Int. Cl.
| | | |
|---|---|---|
| *H01M 50/271* | (2021.01) | |
| *H01M 50/342* | (2021.01) | |
| *H01M 50/383* | (2021.01) | |

(56) References Cited

FOREIGN PATENT DOCUMENTS

| CN | 205488308 | U | 8/2016 |
|---|---|---|---|
| CN | 112086603 | A | 12/2020 |
| CN | 215578936 | U | 1/2022 |
| CN | 217589306 | U | 10/2022 |
| CN | 217811745 | U | 11/2022 |
| CN | 217841410 | U | 11/2022 |
| CN | 115566318 | A | 1/2023 |
| CN | 218467494 | U | 2/2023 |
| EP | 0798793 | A2 | 10/1997 |
| EP | 3993153 | A1 | 5/2022 |
| EP | 4379915 | A1 * | 6/2024 |

OTHER PUBLICATIONS

Written Opinion for PCT /CN2024/074239 mailed Mar. 29, 2024.
Extended search report from corresponding European Patent Application No. 24777482.1 dated Mar. 12, 2026.

* cited by examiner

ENERGY STORAGE DEVICE

CROSS-REFERENCE TO RELATED APPLICATION

This application is a continuation of International application PCT/CN2024/074239 filed on Jan. 26, 2024 that claims priority to Chinese Patent Application No. 202310340880.6 filed on Mar. 31, 2023. The content of these applications is incorporated herein by reference in its entirety.

TECHNICAL FIELD

The present application relates to the field of batteries, and in particular, to an energy storage device.

BACKGROUND

Against the backdrop of increased global support for the development of new energy technologies, various energy storage-related technologies have been widely applied. Among them, the use of electrical cabinets for energy storage has seen widespread application in storing and transporting a plurality of batteries. An electrical cabinet stores a plurality of batteries and allows for unified management and control of these batteries. For example, the plurality of batteries can be charged. Given that thermal runaway may occur in individual batteries during transportation or management of a plurality of batteries, improving the reliability of energy storage devices has become an urgent issue that needs to be addressed.

SUMMARY

Embodiments of the present application provide an energy storage device, and the reliability of the energy storage device can be improved.

In a first aspect, an energy storage device is provided. The energy storage device is used for storing a plurality of batteries, and includes: a first wall and a pressure relief assembly disposed on the first wall.

Therefore, the first wall of the energy storage device according to the embodiments of the present application is provided with the pressure relief assembly. When thermal runaway occurs in the batteries within the energy storage device, and the pressure or temperature inside the energy storage device reaches a predetermined threshold, the pressure relief assembly is actuated to release the internal pressure or reduce the internal temperature of the energy storage device, thereby improving the reliability of the energy storage device.

In some embodiments, the first wall is provided with a through hole, and the pressure relief assembly covers the through hole. By providing the through hole in the first wall and covering the through hole with the pressure relief assembly, the first wall and the pressure relief assembly can be configured as split-type structures. This separate configuration allows for greater flexibility in the structure of the pressure relief assembly, making it easier to meet the design requirements for pressure relief in the energy storage device.

In some embodiments, an adapting part is disposed around the through hole of the first wall, the adapting part being configured to connect the first wall and the pressure relief assembly. By providing the specific adapting part for fixed connection between the first wall and the pressure relief assembly, the connection requirements and sealing requirements between the first wall and the pressure relief assembly can be better satisfied.

In some embodiments, the adapting part protrudes from a surface of the first wall facing away from the interior of the energy storage device. In the case that the adapting part protrudes from the outer surface of the first wall, the connection portion between the adapting part and the pressure relief assembly can also protrude from the outer surface of the first wall. This configuration increases the height of the connection portion between the adapting part and the pressure relief assembly along the height direction, and reduces interference with components inside the first wall. Additionally, the connection interface between the adapting part and the pressure relief assembly can be raised, thereby enhancing the sealing performance of the connection interface.

In some embodiments, the adapting part defines an accommodating space, the adapting part and the pressure relief assembly are connected via a first connecting member, and the accommodating space is configured to accommodate at least a part of the first connecting member. The adapting part can be configured to define the accommodating space, and at least a part of the first connecting member between the adapting part and the pressure relief assembly is arranged within the accommodating space, such that at least a part of the first connecting member can be arranged in a designated position, thereby reducing the impact of the first connecting member on other components and facilitating mounting.

In some embodiments, the adapting part includes a groove, the accommodating space is formed inside the groove, and the opening of the groove faces away from the center of the through hole. In one aspect, the accommodating space is defined by the groove, such that the structure is simple and the implementation is easy. In another aspect, the bottom wall of the groove is closer to the center of the through hole and thus closer to the center of the pressure relief assembly. In the case that the first connecting member between the pressure relief assembly and the adapting part is disposed on the side wall of the groove, then the bottom wall of the groove can serve as a support to bear part of the force exerted by the pressure relief assembly, thereby enhancing the structural strength of the pressure relief assembly. In still another aspect, as the distance between the first connecting member and the bottom wall of the groove is required to meet sealing requirements and strength requirements, the bottom wall of the groove is disposed closer to the center of the through hole, such that the area occupied by the adapting part and the pressure relief assembly on the first wall can be reduced, thereby decreasing the space occupied by the adapting part and the pressure relief assembly and making multiple structures more compact.

In some embodiments, the adapting part and the first wall are of an integrated structure, such that the sealing performance between the adapting part and the first wall can be enhanced.

In some embodiments, the adapting part and the first wall are separately arranged, and the adapting part and the first wall are connected via a second connecting member. The adapting part and the first wall are separately arranged, such that the structural complexity of the first wall can be reduced, and the processing of the adapting part is facilitated.

In some embodiments, the adapting part includes a first part, a second part, and a third part, the second part is configured to connect the first part and the third part arranged opposite to each other, and the first part, the second part, and the third part are configured to define, in an enclosing manner, the accommodating space; the first part is connected to the pressure relief assembly via the first connecting member, and the accommodating space is configured to accommodate at least a part of the first connecting member; the third part is connected to the first wall via the second connecting member. The first part, the second part, and the third part are arranged to form the groove-shaped adapting part with the accommodating space, such that the structure is simple and the implementation is easy.

In some embodiments, the first connecting member includes a riveting structure and/or a bolt structure, and the first connecting member penetrates through the pressure relief assembly and the first part, such that the structure is simple and the implementation is easy.

In some embodiments, the second connecting member includes a weld seam formed by welding the third part to the first wall. The third part and the first wall are fixed by welding, such that the sealing performance and the structural stability between the third part and the first wall can be enhanced.

In some embodiments, the second connecting member includes a sealing member, and the weld seam is provided with the sealing member. By further sealing the weld seam with the sealing member, the sealing performance between the adapting part and the first wall can be further enhanced.

In some embodiments, a protruding structure protruding away from the interior of the energy storage device is disposed around the through hole of the first wall. In one aspect, the position of the adapting part can be located through the protruding structure, thereby facilitating positioning and mounting of the adapting part. In another aspect, the protruding structure can also raise the connection interface between the pressure relief assembly and the adapting part, thereby enhancing the sealing performance.

In some embodiments, the weld seam is located at the protruding structure. Since the protruding structure is disposed in a protruding manner, it is less prone to accumulation of external environmental substances such as rainwater, thereby preventing such substances from affecting the weld seam and further enhancing the sealing performance at the weld seam.

In some embodiments, the energy storage device further includes a support structure, and the support structure is positioned in alignment with the pressure relief assembly and is disposed on a side of the pressure relief assembly facing the interior of the energy storage device. To ensure that the pressure relief assembly can promptly open when the internal temperature or pressure of the energy storage device reaches a predetermined threshold, the structural strength of the pressure relief assembly is typically lower than that of other regions of the first wall. Consequently, during normal operation of the energy storage device, the pressure relief assembly is more prone to damage or failure. Therefore, the support structure can support the pressure relief assembly on the side of the pressure relief assembly proximal to the energy storage device, such that during normal operation of the energy storage device, the risk of collapse or failure of the pressure relief assembly due to excessive external loads is reduced, thereby enhancing the structural strength of the pressure relief assembly. Additionally, in the case of thermal runaway within the energy storage device, the support structure can mitigate the impact on the actuation of the pressure relief assembly, such that the pressure relief assembly can timely reduce the internal temperature or release the internal pressure of the energy storage device, thereby improving the reliability of the energy storage device.

In some embodiments, the support structure is connected to the inner wall of the through hole, and at least a part of the support structure is disposed inside the through hole. Since at least a part of the support structure is disposed inside the through hole, the space can be saved, and the support structure can be placed closer to the pressure relief assembly, thereby enhancing supporting effect of the support structure on the pressure relief assembly.

In some embodiments, the support structure includes at least two intersecting support bars. The intersecting arrangement of at least two support bars enables the at least two support bars to extend in different directions, thereby enhancing structural strength in multiple directions.

In some embodiments, the pressure relief assembly includes a pressure relief plate, and the pressure relief plate is provided with a weakened zone. When the internal pressure or temperature of the energy storage device reaches a predetermined threshold, the weakened zone of the pressure relief plate can be easily destroyed, allowing the pressure relief plate to open promptly. The high-temperature and high-pressure emissions within the energy storage device can then be rapidly discharged from the energy storage device through the through hole and the damaged pressure relief plate, reducing the risk of explosion of the energy storage device and improving the reliability of the energy storage device.

In some embodiments, an edge region of the pressure relief plate is connected to the first wall, and the weakened zone is disposed on a side of at least a part of the edge region of the pressure relief plate proximal to the center of the pressure relief plate. By disposing the weakened zone on at least a part of the edge region, when the internal pressure or temperature of the energy storage device reaches a predetermined threshold, at least a part of the edge region can be destroyed, and the high-temperature and high-pressure emissions within the energy storage device can be promptly discharged through the damaged area. Additionally, since the weakened zone is disposed on the edge region, the enclosed area defined by the weakened zone is relatively large, such that when the pressure relief plate is destroyed, a relatively large area is opened by the pressure relief plate, and the high-temperature and high-pressure emissions within the energy storage device can be discharged more promptly, thereby further reducing the risk of explosion and improving reliability.

In some embodiments, a part of the edge region of the pressure relief plate is not provided with the weakened zone. Since a part of the edge region of the pressure relief plate is not provided with the weakened zone, when the edge region with the weakened zone is destroyed, the pressure relief plate opens from the weakened zone, and the edge region without the weakened zone can remain connected. Specifically, the pressure relief plate can bend at the edge region without the weakened zone, allowing the prompt discharge of high-temperature and high-pressure emissions within the energy storage device through the opened area. Additionally, the structural integrity of the pressure relief plate can be maintained as much as possible, and the risk of localized fragmentation of the pressure relief plate, which may cause damage to other structures or individuals, is minimized.

In some embodiments, the weakened zone includes a score formed on the pressure relief plate, the score having an opening facing away from the interior of the energy storage device. When the internal pressure or temperature of the energy storage device reaches the predetermined threshold, due to the relatively small thickness at the score, the pressure relief plate is easy to be broken at score areas, such that the pressure relief plate promptly opens to allow the discharge of high-temperature and high-pressure emissions within the energy storage device.

In some embodiments, the pressure relief assembly includes a cover, the cover being disposed on a side of the pressure relief plate distal to the interior of the energy storage device, and covering the pressure relief plate. Since the structural strength of the pressure relief plate is insufficient, providing the cover on the side of the pressure relief plate distal to the interior of the energy storage device can protect the pressure relief plate, reduce the impact of the external environment of the energy storage device on the pressure relief plate, and enhance the stability of the pressure relief plate during normal operation of the energy storage device, thereby minimizing the risk of premature failure of the pressure relief plate.

In some embodiments, the cover is a groove structure with an opening facing the pressure relief plate, a part of a side wall of the cover is provided with an extending part, the extending part extends from an end part of the side wall proximal to the opening to a direction away from the side wall, and the extending part is configured to connect the side wall and the first wall. During normal operation of the energy storage device, under the force of gravity, the cover can cover the surface of the pressure relief plate to protect the pressure relief plate. In the case that thermal runaway of the batteries inside the energy storage device occurs, the pressure relief plate is destroyed, and the emissions within the energy storage device are discharged through the pressure relief plate, and then promptly discharged to the exterior of the energy storage device through the area of the side wall of the cover that is not fixed to the first wall, thereby minimizing the risk of explosion of the energy storage device.

In some embodiments, the extending part is positioned in alignment with a side of the pressure relief plate where the weakened zone is not provided. In this way, when the internal pressure or temperature of the energy storage device reaches a predetermined threshold, the opening direction of the pressure relief plate aligns with the opening direction of the cover, reducing obstruction to the emissions. Therefore, the emissions within the energy storage device can be rapidly and smoothly discharged from the energy storage device, thereby improving the reliability of the energy storage device.

In some embodiments, the extending part and the first wall are connected via the first connecting member, such that the structure is simple and the implementation is easy.

In some embodiments, the pressure relief assembly includes a peripheral structure arranged around the periphery of the cover, and the peripheral structure includes a fourth part and a fifth part that are connected and oppositely bent, the fourth part being disposed inside the groove structure, and the fifth part being disposed between the extending part and the first wall and being connected to the first wall.

In the above scheme, since a part of the cover is not directly connected to the first wall or the adapting part, a gap exists between the periphery of the cover and the first wall or the adapting part. Substances from the external environment may enter the interior of the energy storage device through the gap, thereby affecting the internal components of the energy storage device. For example, rainwater may enter the energy storage device and impact the pressure relief assembly. Therefore, the peripheral structure may be provided around the periphery of the cover, and the peripheral structure includes the fourth part and the fifth part that are oppositely bent. The peripheral structure can encircle the periphery of the cover to reduce the ingress of substances from external environment into the interior of the energy storage device through the peripheral gap of the cover. For example, the peripheral structure can reduce the ingress of rainwater into the interior of the energy storage device, thereby protecting the internal components of the energy storage device and improving the safety and sealing performance of the energy storage device.

In some embodiments, the pressure relief plate is provided with a first positioning notch, the extending part is provided with a second positioning notch, and the second positioning notch is arranged in alignment with the first positioning notch. In this way, positioning between the extending part and the pressure relief plate can be achieved. For example, in the case that the first positioning notch is provided on a side of the pressure relief plate where the weakened zone is not provided, the extending part can be disposed in alignment with the side of the pressure relief plate where the weakened zone is not provided through the second positioning notch, thereby improving the mounting efficiency.

The peripheral structure is provided with a third positioning notch, and the third positioning notch is arranged in alignment with the first positioning notch. In one aspect, the third positioning notch of the peripheral structure can be configured to position the mounting position of the peripheral structure, thus improving mounting efficiency. In another aspect, the third positioning notch also can correspond to other positioning structures, for example, enabling other positioning structures to be arranged in alignment with the first positioning notch via the third positioning notch, thereby positioning other structures and improving the mounting efficiency of the pressure relief assembly.

In some embodiments, the first positioning notch does not pass through the midline of an edge of the pressure relief plate where the first positioning notch is located. During the mounting of the pressure relief plate, the first positioning notch may be arranged at a position other than a midline to minimize the risk of incorrectly mounting the opposite side surfaces of the pressure relief plate. For example, the opening of the score of the pressure relief plate is typically required to face the exterior of the energy storage device, such that by using the first positioning notch, the risk of incorrectly orienting the opening of the score of the pressure relief plate can be minimized, thereby improving mounting efficiency.

In some embodiments, the first positioning notch is provided in the edge region of the pressure relief plate where the weakened zone is not provided. By positioning the edge region where the weakened zone is not provided through the first positioning notch, the position of the weakened zone on the pressure relief plate can also be determined. This allows the pressure relief plate to open in a specific direction when destroyed, enabling the emissions within the energy storage device to be discharged in a specific direction, thereby reducing the impact of the high-temperature and high-pressure emissions on the external environment.

In some embodiments, the cover is a groove structure with an opening facing the pressure relief plate, and a part of the side wall of the cover is rotatably connected to the first wall via a third connecting member. During normal operation of the energy storage device, under the force of gravity, the cover can cover the surface of the pressure relief plate to protect the pressure relief plate. In the case that thermal runaway of the batteries inside the energy storage device occurs, the pressure relief plate is destroyed, and the emissions within the energy storage device are discharged through the pressure relief plate. Subsequently, the cover, by rotating through the third connecting member disposed on the side wall, opens to allow the emissions to be promptly discharged to the exterior of the energy storage device, thereby minimizing the risk of explosion of the energy storage device.

In some embodiments, the pressure relief assembly includes two layers of sealing structures, at least parts of the two layers of sealing structures being respectively disposed on two sides of the edge region of the pressure relief plate. That is, the pressure relief plate is clamped between the two layers of sealing structures, so as to enhance the sealing performance of the two sides of the pressure relief plate.

In some embodiments, the two layers of sealing structures are each annular, and arranged to encircle the edge region of the pressure relief plate. This configuration can reduce the impact of the sealing structure on the central area of the pressure relief plate, allowing the pressure relief plate to open promptly when the internal pressure or temperature of the energy storage device reaches a predetermined threshold, thereby releasing the internal pressure or reducing the internal temperature.

In some embodiments, a filling structure is provided between the cover and the pressure relief plate. In one aspect, the filling structure can enhance the sealing performance and the structural stability between the cover and the pressure relief plate. In another aspect, in the case that substances from external environment enter the interior of the energy storage device through the gap between the cover and the first wall, the filling structure can also exhibit some absorption properties. For example, if rainwater enters the interior of the energy storage device through the gap between the cover and the first wall, the filling structure can absorb some of the rainwater, preventing damage to the internal components of the energy storage device.

In some embodiments, the material of the filling structure includes at least one of the following: rock wool, flame-retardant polyurethane foam, glass wool, and phenolic foam to enhance sealing performance. In particular, the use of flame-retardant materials can also minimize heat diffusion and combustion in the case of thermal runaway of the batteries inside the energy storage device, thereby minimizing the risk of explosion of the energy storage device.

In some embodiments, the first wall is a top wall of the energy storage device. When the pressure relief assembly on the first wall is actuated, the discharge of the emissions within the energy storage device through the damaged pressure relief assembly can be directed upward, that is, in the opposite direction to the force of gravity. Compared to the case where the first wall is located on other walls, this configuration can reduce the damage caused by the high-temperature and high-pressure emissions of the energy storage device to surrounding individuals or components, thereby improving reliability.

In some embodiments, a surface of the top wall facing away from the interior of the energy storage device is inclined from the central region of the surface toward the edge region of the surface in the direction of gravity. When substances from external environment such as rainwater fall on the outer surface of the top wall, these substances can slide down the inclined outer surface of the top wall under the force of gravity, reducing the accumulation of rainwater and other substances on the outer surface of the top wall.

This configuration reduces the load on the top wall, thereby extending the service life of the top wall and, in turn, extending the service life of the energy storage device.

In some embodiments, the top wall is provided with stiffening ribs to enhance the structural strength of the top wall.

In some embodiments, the battery includes a plurality of battery cells to meet different power usage requirements.

Figure 1:
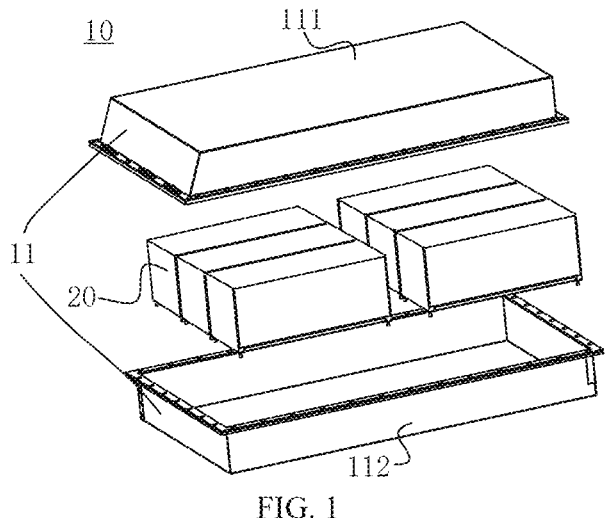
FIG. 1 is a schematic structural diagram of a battery according to an embodiment of the present application.

The drawings are not drawn to scale.

DETAILED DESCRIPTION

The technical solutions in the embodiments of the present application will be described below with reference to the drawings.

To make the objectives, technical solutions, and advantages of embodiments of the present application clearer, the technical solutions in the embodiments of the present application will be clearly described hereinafter with reference to the drawings in the embodiments of the present application. It is obvious that the described embodiments are some, but not all, embodiments of the present application. Based on the embodiments in the present application, all other embodiments obtained by those of ordinary skill in the art without creative work shall fall within the protection scope of the present application.

Unless otherwise defined, all technical and scientific terms used in the present application have the same meaning as commonly understood by those of ordinary skill in the art to which the present application belongs. The terms used in the specification of the present application are only used to describe specific embodiments and are not intended to limit the present application. The terms "include", "comprise", "have", and any variants thereof in the specification and claims of the present application and the above description of the drawings are intended to cover non-exclusive inclusion. The terms "first", "second", and the like in the specification and claims of the present application and the above drawings are used to distinguish different objects and are not intended to describe a specific order or priority.

Reference in the present application to "embodiment" means that a particular feature, structure, or characteristic described in connection with the embodiment can be included in at least one embodiment of the present application. The references of the word in the context of the specification do not necessarily refer to the same embodiment, nor to separate or alternative embodiments exclusive of other embodiments. It will be explicitly and implicitly appreciated by those skilled in the art that the described embodiments of the present application can be combined with other embodiments.

In the description of the present application, it should be noted that unless otherwise explicitly specified or limited, the terms "mount", "link", "connect", and "attach" shall be construed broadly and may be, for example, fixed connection, detachable connection, or integrated connection, or direct connection, indirect connection via an intermediate, or internal communication between two elements. For those of ordinary skill in the art, the specific meanings of the aforementioned terms in the present application can be understood according to specific conditions.

In the present application, the term "and/or" is only an association relationship that describes the associated objects, and indicates that there may be three relationships. For example, A and/or B may indicate that: only A is present, both A and B are present, and only B is present. In addition, the character "/" herein generally indicates an "or" relationship between the associated objects before and after the "/".

In the embodiments of the present application, the same reference numerals represent the same components, and for the sake of brevity, detailed descriptions of the same components are omitted in different embodiments. It should be understood that the thickness, length, width, and other dimensions of various components in the embodiments of the present application shown in the drawings, as well as the overall thickness, length, width, and other dimensions of the integrated device are only exemplary and should not impose any limitation on the present application.

The term "a plurality of" used in the present application refers to more than two (including two). Similarly, "multiple groups" refers to more than two groups (including two groups), and "multiple pieces" refers to more than two pieces (including two pieces).

In the embodiments of the present application, the battery cell may be a secondary battery, which refers to a battery cell that can continue to be used by reactivating the active material through charging after the battery cell is discharged.

The battery cell may be a lithium-ion battery, a sodium-ion battery, a sodium-lithium-ion battery, a lithium metal battery, a sodium metal battery, a lithium-sulfur battery, a magnesium-ion battery, a nickel-hydrogen battery, a nickel-cadmium battery, a lead storage battery, and the like. The embodiments of the present application are not limited thereto.

The battery cell generally includes an electrode assembly. The electrode assembly includes a positive electrode, a negative electrode, and a separator. During the charging and discharging process of the battery cell, active ions (such as lithium ions) are intercalated and deintercalated back and forth between the positive electrode and the negative electrode. The separator is disposed between the positive electrode and the negative electrode to prevent the positive and negative electrodes from short-circuiting while allowing the passage of active ions.

In some embodiments, the positive electrode may be a positive electrode plate, and the positive electrode plate may include a positive electrode current collector and a positive electrode active material disposed on at least one surface of the positive electrode current collector.

As an example, the positive electrode current collector has two surfaces opposite to each other in a thickness direction thereof, and the positive electrode active material is disposed on either or both of the two opposite surfaces of the positive electrode current collector.

As an example, the positive electrode current collector may be a metal foil or a composite current collector. For example, for the metal foil, aluminum or stainless steel treated with silver on the surface, stainless steel, copper, aluminum, nickel, carbon electrode, carbon, nickel, titanium, or the like may be used. The composite current collector may include a polymer material substrate and a metal layer. The composite current collector may be fabricated by forming a metal material (aluminum, aluminum alloy, nickel, nickel alloy, titanium, titanium alloy, silver, silver alloy, etc.) on a polymer material substrate (such as a substrate made of polypropylene, polyethylene terephthalate, polybutylene terephthalate, polystyrene, polyethylene, etc.).

As an example, the positive electrode active material may include at least one of the following materials: a lithium-containing phosphate, a lithium transition metal oxide, and respective modified compounds thereof. However, the present application is not limited to these materials, and other traditional materials that can be used as positive electrode active materials for batteries may also be used. These positive electrode active materials may be used alone or in combination of two or more. Examples of the lithium-containing phosphate may include, but are not limited to, at least one of lithium iron phosphate (such as LiFePO4 (also referred to as LFP)), a composite material of lithium iron phosphate and carbon, lithium manganese phosphate (such as LiMnPO4), a composite material of lithium manganese phosphate and carbon, lithium manganese iron phosphate, and a composite material of lithium manganese iron phosphate and carbon.

In some embodiments, the negative electrode may be a negative electrode plate, and the negative electrode plate may include a negative electrode current collector.

As an example, the negative electrode current collector may be a metal foil or a composite current collector. For example, for the metal foil, aluminum or stainless steel treated with silver on the surface, stainless steel, copper, aluminum, nickel, carbon electrode, carbon, nickel, titanium, or the like may be used. The composite current collector may include a polymer material substrate and a metal layer. The composite current collector may be fabricated by forming a metal material (copper, copper alloy, nickel, nickel alloy, titanium, titanium alloy, silver, silver alloy, etc.) on a polymer material substrate (such as a substrate made of polypropylene, polyethylene terephthalate, polybutylene terephthalate, polystyrene, polyethylene, etc.).

As an example, the negative electrode plate may include a negative electrode current collector and a negative electrode active material disposed on at least one surface of the negative electrode current collector.

As an example, the negative electrode current collector has two surfaces opposite to each other in a thickness direction thereof, and the negative electrode active material is disposed on either or both of the two opposite surfaces of the negative electrode current collector.

As an example, the negative electrode active material may be a negative electrode active material known in the art for use in battery cells. As an example, the negative electrode active material may include at least one of the following materials: artificial graphite, natural graphite, soft carbon, hard carbon, a silicon-based material, a tin-based material, lithium titanate, and the like.

In some embodiments, the negative electrode may be a foam metal. The foam metal may be foam nickel, foam copper, foam aluminum, foam alloy, foam carbon, or the like. When the foam metal is used as the negative electrode plate, the surface of the foam metal may not be provided with the negative electrode active material. Certainly, the negative electrode active material may also be provided.

As an example, the negative electrode current collector may also be filled or/and deposited with a lithium source material, a potassium metal, or a sodium metal; the lithium source material is a lithium metal and/or a lithium-rich material.

In some embodiments, the material of the positive electrode current collector may be aluminum, and the material of the negative electrode current collector may be copper.

In some embodiments, the electrode assembly further includes a separator disposed between the positive electrode and the negative electrode.

In some embodiments, the separator is a separation film. The present application does not particularly limit the type of the separation film, and any porous-structure separation film known to have good chemical stability and mechanical stability may be selected and used.

As an example, the main material of the separation film may be selected from at least one of glass fiber, non-woven fabric, polyethylene, polypropylene, polyvinylidene fluoride, and ceramic.

In some embodiments, the separator is a solid-state electrolyte. The solid-state electrolyte is disposed between the positive electrode and the negative electrode, serving both to transport ions and to isolate the positive electrode and the negative electrode.

In some embodiments, the battery cell further includes an electrolyte that serves to conduct ions between the positive electrode and the negative electrode. The present application does not particularly limit the type of the electrolyte, which can be selected as needed. The electrolyte may be liquid, gel, or solid.

In some embodiments, the electrode assembly is of a wound structure. The positive electrode plate and the negative electrode plate are wound to form a wound structure.

In some embodiments, the electrode assembly is of a stacked structure.

As an example, there may be a plurality of positive electrode plates and a plurality of negative electrode plates, and the plurality of positive electrode plates and the plurality of negative electrode plates are alternately stacked.

As an example, a plurality of positive electrode plates may be disposed, and the negative electrode plate is folded to form a plurality of stacked folded segments, with one positive electrode plate disposed between adjacent folded segments.

As an example, the positive electrode plate and the negative electrode plate are both folded to form a plurality of stacked folded segments.

As an example, there may be a plurality of separators, and each separator is disposed between any adjacent positive electrode plates or negative electrode plates separately.

As an example, the separators may be arranged continuously between any adjacent positive electrode plates or negative electrode plates by means of folding or winding.

In some embodiments, the shape of the electrode assembly may be cylindrical, flat, multi-prismatic, or the like.

In some embodiments, the electrode assembly is provided with tabs that can conduct current out from the electrode assembly. The tab includes a positive tab and a negative tab.

In some embodiments, the battery cell may include a shell. The shell is configured to encapsulate electrode assemblies, electrolytes, and other components. The shell may be a steel housing, an aluminum housing, a plastic housing (such as polypropylene), a composite metal housing (such as a copper-aluminum composite housing), an aluminum-plastic film, or the like. The shell includes a housing and a cover plate.

As an example, the battery cell may be a cylindrical battery cell, a prismatic battery cell, a soft-pack battery cell, or a battery cell of other shapes. The prismatic battery cell includes a square-housing battery cell, a blade-shaped battery cell, and a multi-prismatic battery, and the multi-prismatic battery is, e.g., a hexagonal prismatic battery. This is not particularly limited in the present application.

The battery described in the embodiments of the present application refers to a single physical module that may include one or more battery cells to provide a higher voltage and capacity. When there are a plurality of battery cells, the plurality of battery cells are connected in series, in parallel, or in series-parallel by a busbar component.

In some embodiments, the battery may be a battery module, and when there are a plurality of battery cells, the plurality of battery cells are arranged and fixed to form one battery module.

In some embodiments, the battery may be a battery pack. The battery pack includes a case and a battery cell, and the battery cell or the battery module is accommodated in the case.

In some embodiments, an energy storage device may be used to store and manage a plurality of batteries. Specifically, the energy storage device may include an electrical cabinet or an energy storage container. The energy storage device can be used to store and transport a plurality of batteries, and allow for unified management and control of these batteries. For example, the plurality of batteries can be charged. Given that thermal runaway may occur in individual batteries during transportation or management of a plurality of batteries, reducing the risk of explosion of energy storage devices has become an urgent issue that needs to be addressed.

Based on this, the embodiments of the present application provide an energy storage device for use in storing a plurality of batteries. The first wall of the energy storage device is provided with the pressure relief assembly. In this way, when thermal runaway occurs in the batteries within the energy storage device, and the pressure or temperature inside the energy storage device reaches a predetermined threshold, the pressure relief assembly is actuated to release the internal pressure or reduce the internal temperature of the energy storage device, thereby improving the reliability of the energy storage device.

It should be understood that the energy storage device according to the embodiments of the present application can be used to store batteries, and the energy storage device can be applied to the scenarios of home storage, outdoor energy storage, power grids, and the like.

To meet different power usage requirements, the battery may include a plurality of battery cells. The plurality of battery cells may be connected in series, in parallel, or in series-parallel. The series-parallel connection refers to a mixture of series connection and parallel connection. The battery may also be referred to as a battery pack. Optionally, the plurality of battery cells may be first connected in series, in parallel, or in series-parallel to form a battery module, and then a plurality of battery modules are connected in series, in parallel, or in series-parallel to form a battery. That is, the plurality of battery cells may be directly assembled into a battery, or may be first assembled into a battery module, which is then assembled into a battery.

Figure 2:
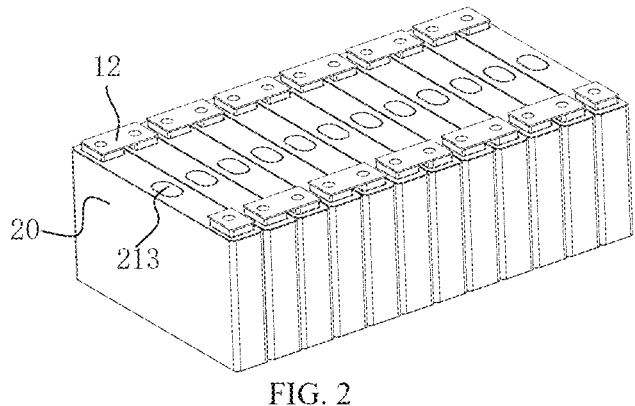
FIG. 2 is a schematic structural diagram of a plurality of battery cells according to an embodiment of the present application.

For example, FIG. 1 illustrates a schematic structural diagram of a battery 10 according to an embodiment of the present application. The battery 10 may include a plurality of battery cells 20. FIG. 2 illustrates a schematic diagram of the plurality of battery cells 20 included in the battery 10. As shown in FIGS. 1 and 2, the battery 10 includes the plurality of battery cells 20. In addition, the battery 10 may further include a case 11, the interior of the case 11 is a hollow structure, and the plurality of battery cells 20 are accommodated in the case 11. FIG. 1 illustrates one possible implementation of the case 11 according to the embodiments of the present application. As shown in FIG. 1, the case 11 may include two parts, herein referred to as a first case part 111 and a second case part 112, respectively, and the first case part 111 and the second case part 112 are snap-fitted together. The shapes of the first case part 111 and the second case part 112 may be determined based on the shape of the battery module 200 assembly, and at least one of the first case part 111 and the second case part 112 has one opening. For example, as shown in FIG. 1, the first case part 111 and the second case part 112 may each be a hollow rectangular parallelepiped, each having only one open face. The opening of the first case part 111 and the opening of the second case part 112 may be disposed opposite to each other, and the first case part 111 and the second case part 112 are snap-fitted together to form the case 11 with an enclosed chamber.

For another example, unlike the configuration shown in FIG. 1, only one of the first case part 111 and the second case part 112 may be a hollow rectangular parallelepiped with an opening, while the other is plate-shaped so as to lid the opening. For example, in an example where the second case part 112 is a hollow rectangular parallelepiped and only one face is the open face, and the first case part 111 is plate-shaped, the first case part 111 lids the opening of the second case part 112 to form the case 11 with an enclosed chamber, which can be used to accommodate a plurality of battery cells 20. The plurality of battery cells 20, after being connected in parallel, in series, or in series-parallel, are disposed inside the case 11 formed after the first case part 111 and the second case part 112 are snap-fitted together.

Optionally, the battery 10 may further include other structures, which are not described in detail herein. For example, as shown in FIGS. 1 and 2, the battery 10 may further include a busbar component 12, and the busbar component 12 is configured to achieve electrical connection among the plurality of battery cells 20, such as in parallel, in series, or in series-parallel connection. Specifically, the busbar component 12 may achieve electrical connection among the battery cells 20 by connecting to electrode terminals 214 of the battery cells 20. Further, the busbar component 12 may be fixed to the electrode terminals 214 of the battery cells 20 by welding. The electrical energy of the plurality of battery cells 20 can be further conducted through a conductive mechanism passing through the case 11.

Based on different power requirements, the number of the battery cells 20 in the battery 10 may be set to any numerical value. The plurality of battery cells 20 may be connected in series, in parallel, or in series-parallel to achieve a higher capacity or power. Since the number of the battery cells 20 included in each battery 10 may be relatively large, the battery cells 20 may also be arranged in groups for ease of mounting, with each group of the battery cells 20 forming a battery module. The number of the battery cells 20 included in the battery module is not limited and may be set as desired.

Figure 3:
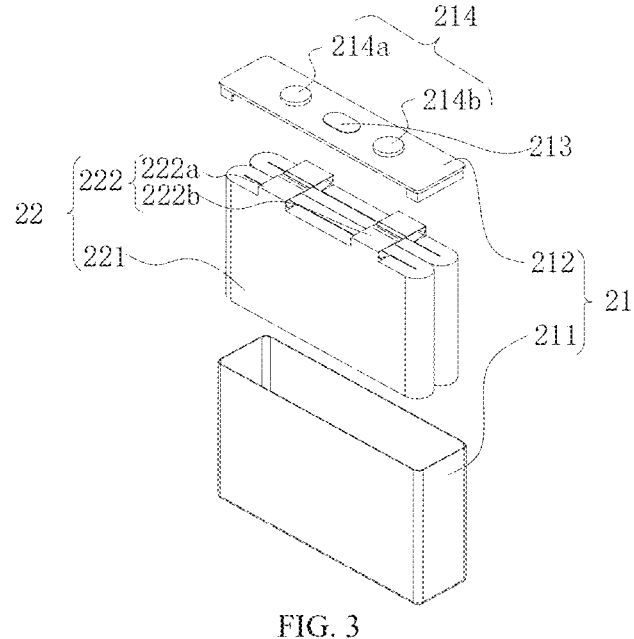
FIG. 3 is an exploded view of a battery cell according to an embodiment of the present application.

FIG. 3 is a schematic diagram of a partially exploded structure of a battery cell 20 according to an embodiment of the present application. For example, the battery cell 20 shown in FIG. 3 may be any one of the battery cells 20 shown in FIGS. 1 and 2. As shown in FIGS. 2 and 3, the battery cell 20 according to the embodiments of the present application may include: a shell 21. Specifically, the shell 21 may include: a housing 211, the housing 211 being a hollow structure having at least one opening; a cover plate 212, configured to lid the opening of the housing; and an electrode assembly 22 accommodated in the shell 21.

It should be understood that the housing 211 according to the embodiments of the present application is a member configured to accommodate the electrode assembly 22, and the housing 211 may be of a hollow structure with an opening formed at one or multiple ends. For example, in the case that the housing 211 is of a hollow structure with an opening formed at one end, one cover plate 212 may be provided; in the case that the housing 211 is of a hollow structure with an opening formed at two opposite ends, two cover plates 212 may be provided, and the two cover plates 212 respectively lid the openings at the two ends of the housing 211.

The housing 211 may be in various shapes, such as a cylinder, a rectangular parallelepiped, or other polyhedrons. Illustratively, as shown in FIGS. 2 and 3, in the description of the embodiments of the present application, the housing 211 is mainly of a rectangular parallelepiped structure, and the housing 211 is of a hollow structure with an opening formed at one end.

It should be understood that the cover plate 212 according to the embodiments of the present application is a member configured to lid the opening of the housing 211, thereby isolating the internal environment of the battery cell 20 from the external environment. The shape of the cover plate 212 may be adapted to the shape of the housing 211. As shown in FIGS. 2 and 3, the housing 211 is of a rectangular parallelepiped structure, and the cover plate 212 is a rectangular plate-shaped structure matching the housing 211.

In the embodiments of the present application, the housing 211 may be made of a variety of materials, such as copper, iron, aluminum, steel, and aluminum alloy. The cover plate 212 may also be made of a variety of materials, such as copper, iron, aluminum, steel, and aluminum alloy. Optionally, the cover plate 212 and the housing 211 may be made of the same or different materials.

It should be understood that the battery cell 20 also includes the electrode terminal 214. The electrode terminal 214 according to the embodiments of the present application is configured to be electrically connected to the electrode assembly 22 inside the battery cell 20 to output the electrical energy of the battery cell 20. As shown in FIGS. 2 and 3, the battery cell 20 may include at least two electrode terminals 214, and the at least two electrode terminals 214 may include at least one positive electrode terminal 214a and at least one negative electrode terminal 214b. The positive electrode terminal 214a is configured to be electrically connected to a positive electrode tab 222a of the electrode assembly 22 and the negative electrode terminal 214b is configured to be electrically connected to a negative electrode tab 222b of the electrode assembly 22.

In some embodiments, the at least two electrode terminals 214 included in the battery cell 20 may be disposed on the same wall or on different walls. For example, as illustrated in FIGS. 2 and 3, two electrode terminals 214 are disposed on the same wall. However, the embodiments of the present application are not limited thereto.

It should be understood that the positive electrode terminal 214a and the positive electrode tab 222a may be directly connected or indirectly connected, and the negative electrode terminal 214b and the negative electrode tab 222b may be directly connected or indirectly connected. Illustratively, the positive electrode terminal 214a may be electrically connected to the positive electrode tab 222a via a connecting member, and the negative electrode terminal 214b may be electrically connected to the negative electrode tab 222b via a connecting member.

In the battery cell 20, the electrode assembly 22 is the component of the battery cell 20 where electrochemical reactions occur, and one or more electrode assemblies 22 may be disposed in the housing 211 based on actual use requirements. For example, as shown in FIG. 3, two electrode assemblies 22 are provided in the battery cell 20. The electrode assembly 22 may be cylindrical, rectangular parallelepiped-shaped, or in other shapes. If the electrode assembly 22 is of a cylindrical structure, the housing 211 may also be of a cylindrical structure, and if the electrode assembly 22 is of a rectangular parallelepiped structure, the housing 211 may also be of a rectangular parallelepiped structure.

It should be understood that, as shown in FIG. 3, the electrode assembly 22 includes a tab 222 and an electrode body part 221. The tab 222 of the electrode assembly 22 may include a positive electrode tab 222a and a negative electrode tab 222b, the positive electrode tab 222a may be formed by stacking the portions of the positive electrode plate that are not coated with the positive electrode active substance layer, and the negative electrode tab 222b may be formed by stacking the portions of the negative electrode plate that are not coated with negative electrode active substance layer. The electrode body part 221 may be formed by stacking the positive electrode plate and the negative electrode plate or by winding them together.

It should be understood that the battery cell 20 may further include other components. For example, the battery cell 20 may further include a pressure relief mechanism 213. The pressure relief mechanism 213 may be disposed at any position of the battery cell 20. For example, as shown in FIG. 3, the pressure relief mechanism 213 may be disposed on the same wall as the electrode terminal 214. However, the embodiments of the present application are not limited thereto.

The pressure relief mechanism 213 refers to an element or a component that is actuated to release the internal pressure or reduce the internal temperature of the battery cell 20 when the internal pressure or temperature reaches a predetermined threshold. The designed thresholds vary depending on different design requirements. The threshold may depend on the material of one or more of the positive electrode plate, the negative electrode plate, the electrolytic solution, and the separation film in the battery cell 20. The pressure relief mechanism 213 may take the form of an explosion-proof valve, a gas valve, a pressure relief valve, a safety valve, or the like, and may specifically adopt a pressure-sensitive or temperature-sensitive element or configuration. That is, when the internal pressure or temperature of the battery cell 20 reaches a predetermined threshold, the pressure relief mechanism 213 is actuated or the weakened structure provided in the pressure relief mechanism 213 is destroyed to form an opening or a channel for releasing the internal pressure or reducing the internal temperature.

The term "actuate" as used herein means that the pressure relief mechanism 213 generates an action or is activated to a certain state to allow the release of the internal pressure and the reduction of the internal temperature of the battery cell 20. The actions generated by the pressure relief mechanism 213 may include, but are not limited to: rupture, breakage, tearing, or opening of at least a part of the pressure relief mechanism 213. When the pressure relief mechanism 213 is actuated, high-temperature and high-pressure substances inside the battery cell 20 are discharged outwards from the actuated part as emissions. In this way, the battery cell 20 can undergo pressure release and temperature reduction under the condition of controllable pressure or temperature, thereby preventing potentially more severe accidents.

The emissions from the battery cell 20 referred to in the present application include, but are not limited to: electrolytic solution, dissolved or split positive and negative electrode plates, fragments of a separation film, high-temperature and high-pressure gas generated by reaction, flame, and the like.

The pressure relief mechanism 213 on the battery cell 20 has an important effect on the reliability of the battery. For example, in the case of a short circuit, overcharging, or the like, thermal runaway may occur within the battery cell 20, resulting in a rapid increase in pressure or temperature. In this way, actuation of the pressure relief mechanism 213 allows the outward release of the internal pressure and the reduction of the internal temperature, so as to prevent explosion and fire of the battery cell 20.

Figure 4:
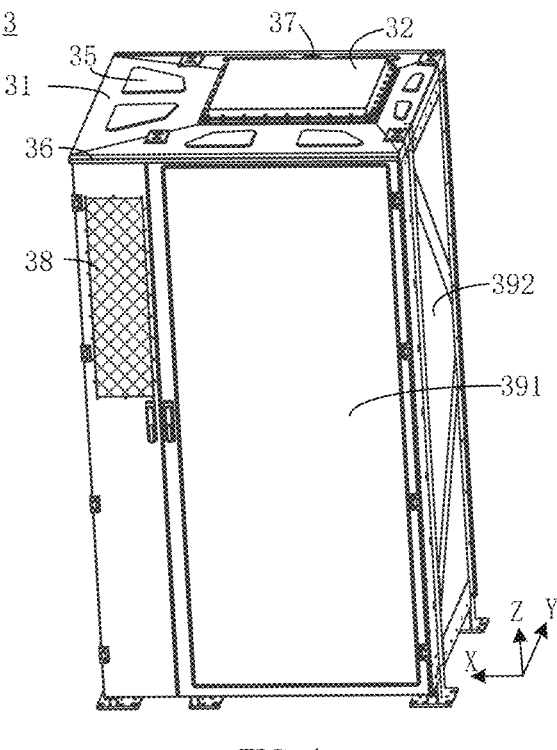
FIG. 4 is a schematic structural diagram of an energy storage device according to an embodiment of the present application.
Figure 5:
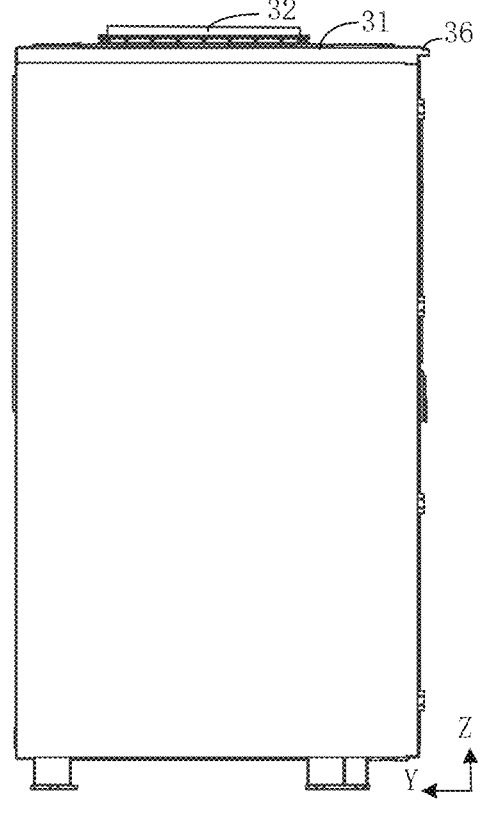
FIG. 5 is a schematic structural diagram from a side view of an energy storage device according to an embodiment of the present application.

FIG. 4 illustrates a schematic structural diagram of the energy storage device 3 according to the embodiments of the present application. FIG. 5 illustrates a schematic diagram from a side view of one energy storage device 3 according to the embodiments of the present application. For example, FIG. 5 may be a schematic diagram from a left side view of the energy storage device 3 shown in FIG. 4. As shown in FIGS. 4 and 5, the energy storage device 3 according to the embodiments of the present application is used for storing a plurality of batteries 10, and the energy storage device 3 includes: a first wall 31 and a pressure relief assembly 32 disposed on the first wall 31.

It should be understood that the energy storage device 3 according to the embodiments of the present application may be of a hollow polyhedral structure, such as a cylindrical structure. The interior of the energy storage device 3 can be used for storing a plurality of batteries 10. The energy storage device 3 may include a plurality of walls, the first wall 31 according to the embodiments of the present application may be any one wall of the energy storage device 3, and correspondingly, the first wall 31 may have any shape. For example, in the embodiments of the present application, the first wall 31 is primarily a rectangular wall. However, the embodiments of the present application are not limited thereto.

In some embodiments, as shown in FIGS. 4 and 5, the energy storage device 3 may be of, for example, a regular rectangular parallelepiped structure, and the six faces of the rectangular parallelepiped are six outer walls of the energy storage device 3. Configuring the energy storage device 3 as a rectangular parallelepiped structure can facilitate the stable placement and transportation of the energy storage device 3.

The interior of the energy storage device 3 is of a hollow structure, and this hollow structure may be divided into a plurality of functional compartments based on actual requirements. For example, the energy storage device 3 may include an energy storage compartment, a thermal management compartment, and a control compartment. The energy storage compartment may be configured to accommodate energy storage elements for providing electrical energy, such as storing a plurality of batteries 10. The thermal management compartment may be configured to accommodate thermal management components for regulating the temperature of the batteries 10 inside the energy storage device 3. The control compartment may be configured to accommodate a control box for managing or assisting in the operation of the components in the energy storage device 3.

In some embodiments, the positions of the energy storage compartment, the thermal management compartment, and the control compartment in the energy storage device 3 may be configured based on actual applications. For example, as shown in FIG. 4, the energy storage compartment may be disposed on the right side of the energy storage device 3, and the thermal management compartment and the control compartment may be arranged along the height direction Z on the left side, for example, the thermal management compartment being positioned above the control compartment. Alternatively, configurations different from those shown in FIG. 4 may also be adopted.

In some embodiments, the number of the pressure relief assembly 32 according to the embodiments of the present application may be one or more. In the case that the energy storage device 3 includes a plurality of pressure relief assemblies 32, the plurality of pressure relief assemblies 32 may be disposed at different locations of the same wall, or may be disposed on different walls.

In the embodiments of the present application, a plurality of batteries 10 are stored inside the energy storage device 3. When at least one battery 10 undergoes thermal runaway, causing the pressure or temperature inside the energy storage device 3 to rise and reach a predetermined threshold, the pressure relief assembly 32 is actuated to release the internal pressure or reduce the internal temperature of the energy storage device 3. In one aspect, the reliability of the energy storage device 3 is improved; in another aspect, the risk of heat diffusion among the plurality of batteries 10 inside the energy storage device 3 can be reduced.

In the embodiments of the present application, for ease of description, three directions perpendicular to each other are defined based on the placement position of the energy storage device 3. As shown in FIGS. 4 and 5, the three directions include a length direction X, a width direction Y, and a height direction Z of the energy storage device 3. Specifically, the width direction Y of the energy storage device 3 may be defined as the direction perpendicular to the cabinet door 391 of the energy storage device 3; the height direction Z of the energy storage device 3 may be defined as the direction parallel to the gravity direction.

It should be understood that as shown in FIGS. 4 and 5, the first wall 31 according to the embodiments of the present application is the top wall of the energy storage device 3. The top wall is a wall perpendicular to the height direction Z of the energy storage device 3, and when the energy storage device 3 is placed in an upright position, the top wall is located above the energy storage device 3. In this way, when the pressure relief assembly 32 on the first wall 31 is actuated, the discharge of the emissions within the energy storage device 3 through the damaged pressure relief assembly 32 can be directed upward, that is, in the opposite direction to the force of gravity. Compared to the case where the first wall 31 is located on other walls, this configuration can reduce the damage caused by the high-temperature and high-pressure emissions of the energy storage device 3 to surrounding individuals or components, thereby improving reliability.

In the embodiments of the present application, the top wall may further be provided with other structures.

In some embodiments, the top wall is provided with stiffening ribs 35 to enhance the structural strength of the top wall. For example, during the use of the energy storage device 3, rainwater or other substances may be deposited on the top wall, resulting in an increasing load on the top wall. The stiffening ribs 35 can increase the load-bearing capacity of the top wall, and reduce the risk of collapse or damage of the top wall, thereby extending the service life of the top wall and, in turn, extending the service life of the energy storage device 3.

The distribution, quantity, shape, and size of the stiffening ribs 35 in the embodiments of the present application may be configured based on actual applications. For example, as shown in FIGS. 4 and 5, the top wall may include a plurality of stiffening ribs 35, and the shape and size of the various stiffening ribs 35 may be identical or different. For example, to optimize the utilization of space on the top wall, stiffening ribs 35 of different shapes and sizes may be provided. For example, the shape of the stiffening ribs 35 according to the embodiments of the present application may include a ring shape, a rectangular shape, a circular shape, a trapezoidal shape, or other shapes.

In addition, the surface of the pressure relief assembly 32 away from the interior of the energy storage device 3 may or may not be provided with the stiffening rib 35. For example, as shown in FIGS. 4 and 5, the surface of the pressure relief assembly 32 facing away from the interior of the energy storage device 3 is not provided with the stiffening rib 35. However, the embodiments of the present application are not limited thereto.

The arrangement of the stiffening ribs 35 according to the embodiments of the present application may be flexibly configured based on actual applications. For example, the stiffening rib 35 may be a protruding structure protruding from the surface of the top wall facing away from the interior of the energy storage device 3. In one aspect, the structural strength of the top wall can be increased, and in another aspect, the protruding part can also reduce the accumulation of rainwater on the top wall and reduce the load of the top wall.

In some embodiments, the top wall may further include an extension structure 36 disposed on at least a part of the edge region of the top wall. Specifically, as shown in FIGS. 4 and 5, the at least a part of the edge region of the top wall is provided with the extension structure 36, and the extension structure 36 extends beyond the corresponding side wall in the width direction Y or in the length direction X. For example, taking a rectangular first wall 31 as an example, where the first wall 31 includes four sides, and taking one of the four sides that is parallel to the length direction X as an example, this side may be provided with the extension structure 36, and the extension structure 36 extends beyond the corresponding wall in the width direction X. Considering that the top wall and other walls of the energy storage device 3 are typically not of an integrated structure, there may be gaps at the junctions of the top wall and the other walls. By providing the extension structure 36, these junction gaps between the top wall and the other walls can be covered and shielded, reducing the impact of the external environment on the interior of the energy storage device 3. For example, infiltration of rainwater into the interior of the energy storage device 3 through the gaps between the top wall and the other walls can be reduced, thereby improving the reliability of the energy storage device 3.

In some embodiments, the energy storage device 3 includes a cabinet 392 and a cabinet door 391, and the extension structure 36 is disposed on a side of the top wall proximal to the cabinet door 391, so as to reduce the probability of rainwater entering the interior of the energy storage device 3.

In some embodiments, the top wall may further include a fire protection pipeline interface 37, such that an external fire protection pipeline can be connected to the fire protection pipeline interface 37 when thermal runaway occurs in the battery 10 inside the energy storage device 3. For example, the fire protection pipeline interface 37 may be connected to a water pipe to cool the interior of the energy storage device 3 and extinguish fire.

In some embodiments, the energy storage device 3 may further include other structures. For example, as shown in FIGS. 4 and 5, the energy storage device 3 may further include a ventilation structure 38. The ventilation structure 38 may be disposed on any one of the walls of the energy storage device 3 to dissipate heat inside the energy storage device 3 to the outside, thereby reducing the internal temperature of the energy storage device 3, and further improving the reliability of the internal battery 10. Specifically, the ventilation structure 38 may be implemented in a variety of ways. For example, the ventilation structure 38 may include, but is not limited to, louvers or mesh.

Figure 6:
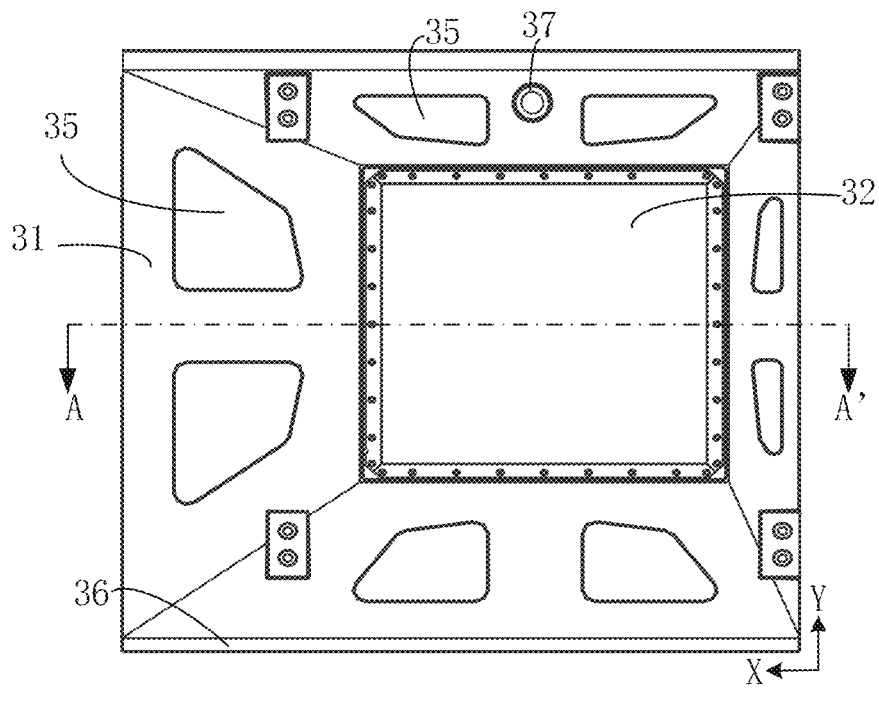
FIG. 6 is a schematic diagram from a top view of a first wall according to an embodiment of the present application.
Figure 7:
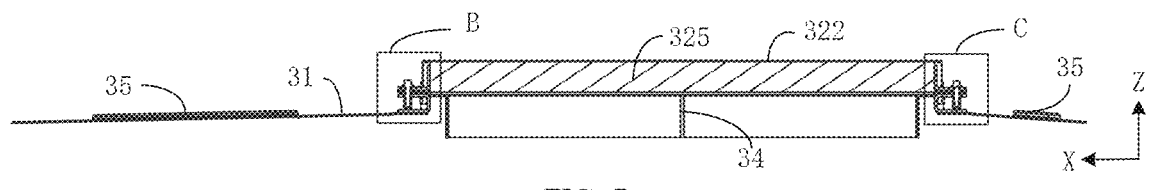
FIG. 7 is a schematic cross-sectional view of a partial portion of a first wall according to an embodiment of the present application.

FIG. 6 illustrates a schematic diagram from a top view of the first wall 31 according to the embodiments of the present application. For example, the first wall 31 may be the top wall of the energy storage device 3 as shown in FIGS. 4 and 5. FIG. 7 illustrates a schematic cross-sectional view of the first wall 31 according to the embodiments of the present application. For example, FIG. 7 may be a schematic cross-sectional view in the direction A-A' shown in FIG. 6, and the cross-section shown in FIG. 7 is perpendicular to the width direction Y.

As shown in FIGS. 6 and 7, the outer surface of the top wall according to the embodiments of the present application, which is the surface facing away from the interior of the energy storage device 3, may be a plane perpendicular to the height direction Z, that is, a plane parallel to the horizontal plane, or an inclined plane relative to the horizontal plane.

In some embodiments, the surface of the top wall facing away from the interior of the energy storage device 3 is inclined from the central region of the surface toward the edge region of the surface in the direction of gravity. Specifically, as shown in FIGS. 5 and 6, the surface of the top wall facing away from the interior of the energy storage device 3 is defined as the outer surface of the top wall, and therefore the outer surface of the top wall is relatively inclined and is not perpendicular to the height direction Z. For example, in the height direction Z, the central region of the outer surface of the top wall is relatively high, while the edge region of the outer surface of the top wall is relatively low, such that the outer surface of the top wall is gradually inclined. In this way, when substances from external environment such as rainwater fall on the outer surface of the top wall, these substances can slide down the inclined outer surface of the top wall under the force of gravity, reducing the accumulation of rainwater and other substances on the outer surface of the top wall. This configuration reduces the load on the top wall, thereby extending the service life of the top wall and, in turn, extending the service life of the energy storage device 3.

In some embodiments, the inclined outer surface of the top wall may be implemented in a variety of ways. For example, as shown in FIGS. 6 and 7, the outer surface of the top wall is rectangular. Excluding the central region where the pressure relief assembly 32 is located, the remaining part of the outer surface of the top wall may be divided diagonally into four planes. The intersecting lines of these four planes form ridges on the outer surface of the top wall, thereby creating four intersecting inclined surfaces on the outer surface of the top wall. For another example, unlike FIGS. 6 and 7, the outer surface of the top wall may not have ridges. For example, the outer surface of the top wall may also be an outer surface of an approximately conical structure, such that the outer surface of the top wall is more rounded and smoother. However, the embodiments of the present application are not limited thereto.

The surface of the pressure relief assembly 32, which is disposed on the first wall 31 and faces away from the energy storage device 3, may also be arranged as a plane perpendicular to the height direction Z, i.e., a plane parallel to the horizontal plane, or an inclined plane relative to the horizontal plane. For example, in the case that the region where the pressure relief assembly 32 is located is the central region of the first wall 31, as shown in FIGS. 6 and 7, the surface of the pressure relief assembly 32 facing away from the energy storage device 3 may be arranged parallel to the horizontal plane. For another example, unlike FIGS. 6 and 7, the surface of the pressure relief assembly 32 facing away from the energy storage device 3 may also be inclined relative to the horizontal plan.

Figure 8:
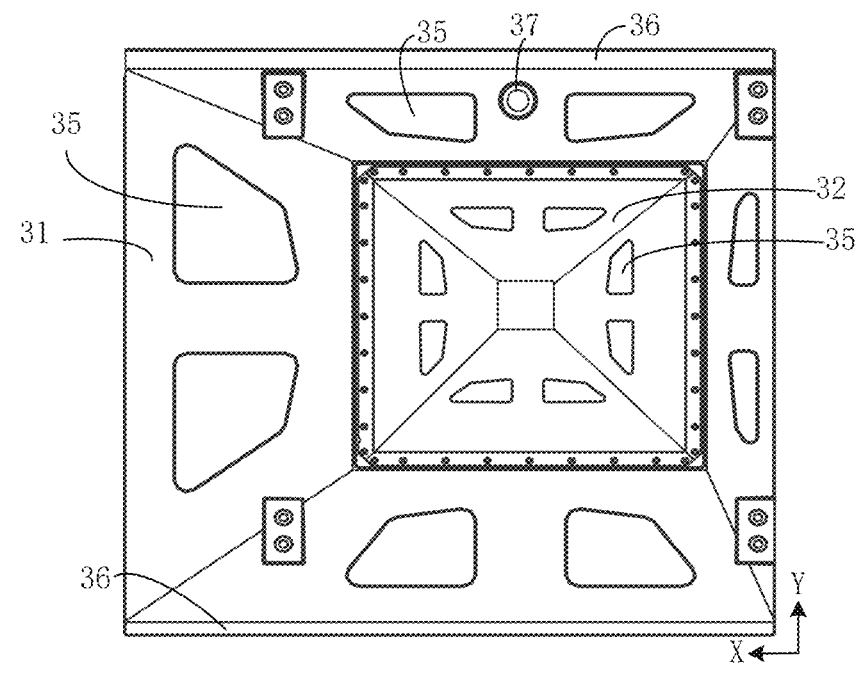
FIG. 8 is a schematic diagram from a top view of a first wall according to another embodiment of the present application.

For example, FIG. 8 illustrates another schematic diagram from a top view of the first wall 31 according to the embodiments of the present application. Comparing FIG. 8 with FIG. 6, the surface of the pressure relief assembly 32 of the first wall 31 facing away from the interior of the energy storage device 3 may further be provided with one or more stiffening ribs 35 to enhance the structural strength of the pressure relief assembly 32. Specifically, the stiffening rib may be disposed on a cover 322 of the pressure relief assembly 32. The cover 322 of the pressure relief assembly 32 is described below.

In some embodiments, as shown in FIG. 8, the surface of the pressure relief assembly 32 facing away from the energy storage device 3 may be inclined from the central region of the surface toward the edge region of the surface in the direction of gravity, so as to reduce substances from external environment such as rainwater falling on the surface of the pressure relief assembly 32 facing away from the energy storage device 3, such that the substances can slide down the inclined surface under the force of gravity, reducing pressure on the pressure relief assembly 32, and further improving the reliability of the pressure relief assembly 32. Specifically, the surface of the pressure relief assembly 32 facing away from the energy storage device 3 may be the surface of the cover 322 of the pressure relief assembly 32. The cover 322 of the pressure relief assembly 32 is described below.

The inclined surface of the pressure relief assembly 32 facing away from the energy storage device 3 may be implemented in a variety of ways. For example, as shown in FIG. 8, the surface of the pressure relief assembly 32 facing away from the energy storage device 3 is rectangular. Similar to other regions of the first wall 31, the surface of the pressure relief assembly 32 facing away from the energy storage device 3 may be divided diagonally into four planes, or the region excluding the central portion may be divided diagonally into four planes. The intersecting lines of these four planes form ridges on the surface of the pressure relief assembly 32, thereby creating four intersecting inclined surfaces on the surface of the pressure relief assembly 32. For another example, unlike FIG. 8, the surface of the pressure relief assembly 32 may not have ridges. For example, the surface of the pressure relief assembly 32 may also be an outer surface of an approximately conical structure, such that the outer surface of the top wall is more rounded and smoother. However, the embodiments of the present application are not limited thereto.

It should be understood that the pressure relief assembly 32 and the first wall 31 according to the embodiments of the present application may be of an integrated structure or split-type structures. For example, in the case that the pressure relief assembly 32 and the first wall 31 are of an integrated structure, the pressure relief assembly 32 may include a score or other weakened structures provided on the first wall 31, such that when the internal pressure or temperature of the energy storage device 3 reaches a predetermined threshold, the pressure relief assembly 32 can be destroyed to release the internal pressure or reduce the internal temperature of the energy storage device 3. Specifically, in the case that the first wall 31 includes a multi-layer structure, the pressure relief assembly 32 may include a score provided on each layer of the multi-layer structure.

For another example, the pressure relief assembly 32 and the first wall 31 may be of split-type structures. Referring to the drawings, a detailed description using an example where the pressure relief assembly 32 and the first wall 31 are of split-type structures is provided below.

Figure 9:
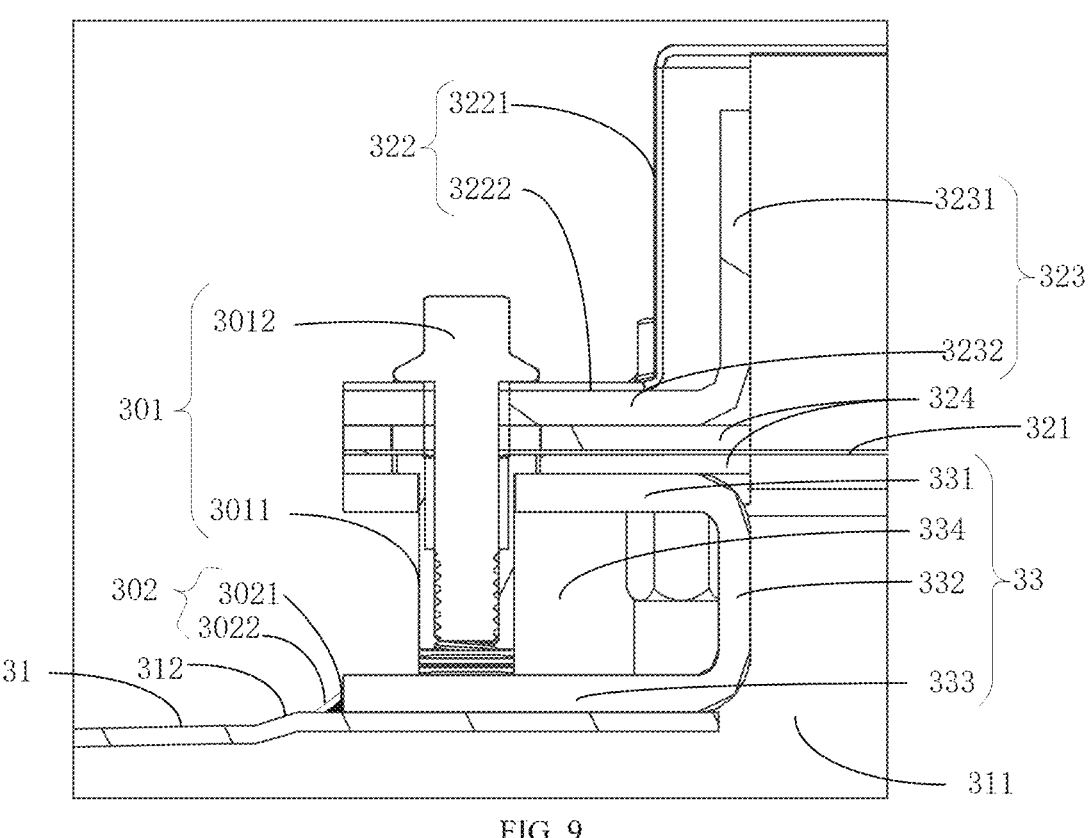
FIG. 9 is a schematic cross-sectional view of another partial portion of a first wall according to an embodiment of the present application.
Figure 10:
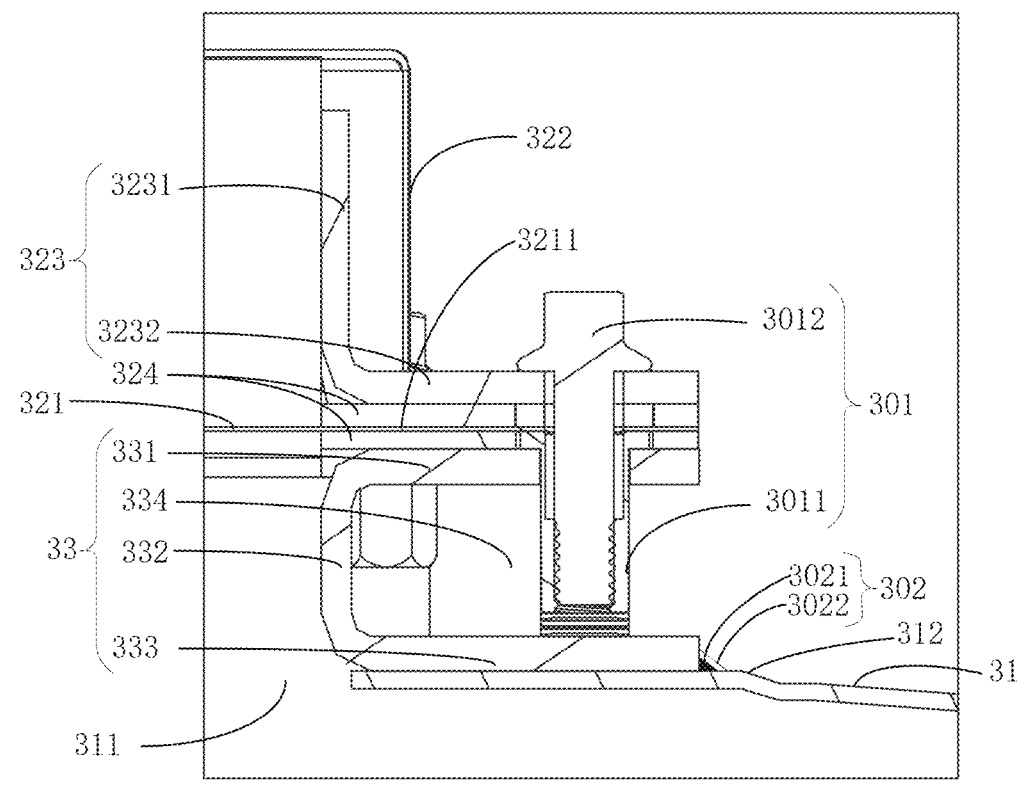
FIG. 10 is a schematic cross-sectional view of still another partial portion of a first wall according to an embodiment of the present application.
Figure 11:
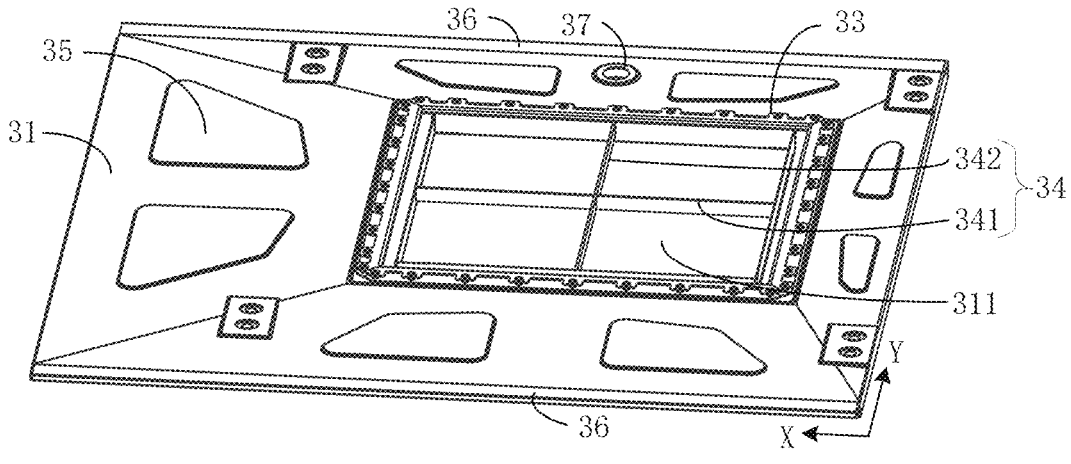
FIG. 11 is a schematic structural diagram of a first wall without a pressure relief assembly according to an embodiment of the present application.

FIGS. 9 and 10 respectively illustrate schematic cross-sectional views of different partial portions of the first wall 31 according to the embodiments of the present application. FIG. 9 is an enlarged view of the region B in the cross-sectional view shown in FIG. 7, and FIG. 10 is an enlarged view of the region C in the cross-sectional view shown in FIG. 7. FIG. 11 shows a schematic cross-sectional view of a partial portion of the first wall 31 according to the embodiments of the present application. For example, the first wall 31 shown in FIG. 11 differs from the first wall 31 shown in FIGS. 6 and 7 in that the first wall 31 shown in FIG. 11 does not include the pressure relief assembly 32.

As shown in FIGS. 9 to 11, the first wall 31 is provided with a through hole 311, and the pressure relief assembly 32 covers the through hole 311. By providing the through hole 311 in the first wall 31 and covering the through hole 311 with the pressure relief assembly 32, the first wall 31 and the pressure relief assembly 32 can be configured as split-type structures. This separate configuration allows for greater flexibility in the structure of the pressure relief assembly 32, making it easier to meet the design requirements for pressure relief in the energy storage device 3.

In the embodiments of the present application, an adapting part 33 is disposed around the through hole 311 of the first wall 31, the adapting part 33 being configured to connect the first wall 31 and the pressure relief assembly 32. By providing the specific adapting part 33 for fixed connection between the first wall 31 and the pressure relief assembly 32, the connection requirements and sealing requirements between the first wall 31 and the pressure relief assembly 32 can be better satisfied.

In the embodiments of the present application, the adapting part 33 protrudes from a surface of the first wall 31 facing away from the interior of the energy storage device 3. In the case that the adapting part 33 protrudes from the outer surface of the first wall 31, the connection portion between the adapting part 33 and the pressure relief assembly 32 can also protrude from the outer surface of the first wall 31. This configuration increases the height of the connection portion between the adapting part 33 and the pressure relief assembly 32 along the height direction, and reduces interference with components inside the first wall 31. Additionally, the connection interface between the adapting part 33 and the pressure relief assembly 32 can be raised, thereby enhancing the sealing performance of the connection interface.

In some embodiments, as shown in FIGS. 9 to 11, the adapting part 33 defines an accommodating space 334, the adapting part 33 and the pressure relief assembly 32 are connected via a first connecting member 301, and the accommodating space 334 is configured to accommodate at least a part of the first connecting member. The adapting part 33 can be configured to define the accommodating space 334, and at least a part of the first connecting member 301 between the adapting part 33 and the pressure relief assembly 32 is arranged within the accommodating space 334, such that at least a part of the first connecting member 301 can be arranged in a designated position, thereby reducing the impact of the first connecting member 301 on other components and facilitating mounting.

In some embodiments, as shown in FIGS. 9 to 11, the adapting part 33 includes a groove, the accommodating space 334 is formed inside the groove, and the opening of the groove faces away from the center of the through hole 311. In one aspect, the accommodating space 334 is defined by the groove, such that the structure is simple and the implementation is easy. In another aspect, the bottom wall of the groove is disposed closer to the center of the through hole 311 and thus closer to the center of the pressure relief assembly 32. In the case that the first connecting member 301 between the pressure relief assembly 32 and the adapting part 33 is disposed on the side wall of the groove, then the bottom wall of the groove can serve as a support to bear part of the force exerted by the pressure relief assembly 32, thereby enhancing the structural strength of the pressure relief assembly 32. In still another aspect, as the distance between the first connecting member 301 and the bottom wall of the groove is required to meet sealing requirements and strength requirements, the bottom wall of the groove is disposed closer to the center of the through hole 311, such that the area occupied by the adapting part 33 and the pressure relief assembly 32 on the first wall 31 can be reduced, thereby decreasing the space occupied by the adapting part 33 and the pressure relief assembly 32 and making multiple structures more compact.

In some embodiments, the adapting part 33 and the first wall 31 are of an integrated structure, such that the sealing performance between the adapting part 33 and the first wall 31 can be enhanced.

Figure 12:
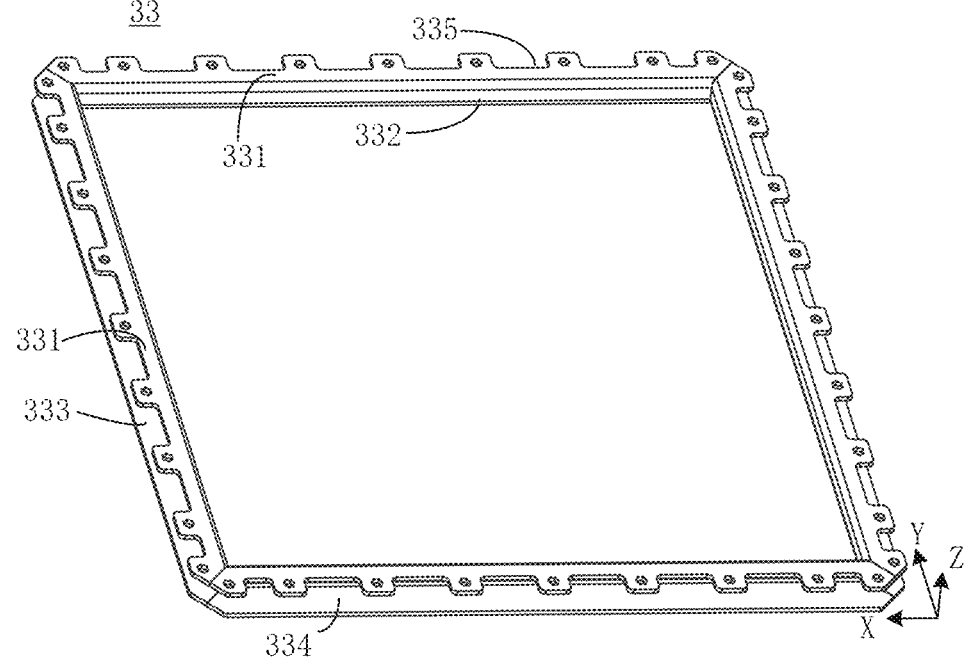
FIG. 12 is a schematic structural diagram of an adapting part according to an embodiment of the present application.

Alternatively, as shown in FIGS. 9 to 11, the adapting part 33 and the first wall 31 are separately arranged, and the adapting part 33 and the first wall 31 are connected via a second connecting member 302. Specifically, FIG. 12 illustrates a schematic structural diagram of the adapting part 33 according to the embodiments of the present application. As shown in FIGS. 9 to 12, the adapting part 33 and the first wall 31 are separately arranged, such that the structural complexity of the first wall 31 can be reduced, and the processing of the adapting part 33 is facilitated.

Specifically, as shown in FIGS. 9 to 12, the adapting part 33 includes a first part 331, a second part 332, and a third part 333, the second part 332 is configured to connect the first part 331 and the third part 333 arranged opposite to each other, and the first part 331, the second part 332, and the third part 333 are configured to define, in an enclosing manner, the accommodating space 334; the first part 331 is connected to the pressure relief assembly 32 via the first connecting member 301, and the accommodating space 334 is configured to accommodate at least a part of the first connecting member 301; the third part 333 is connected to the first wall 31 via the second connecting member 302. The first part 331, the second part 332, and the third part 333 are arranged to form the groove-shaped adapting part 33 with the accommodating space 334, such that the structure is simple and the implementation is easy.

It should be understood that according to the embodiments of the present application, the connection manner between the adapting part 33 and the first wall 31 may be flexibly configured based on actual applications; the connection manner between the adapting part 33 and the pressure relief assembly 32 can also be flexibly configured based on actual applications; and the connection manner between the adapting part 33 and the first wall 31 and the connection manner between the adapting part 33 and the pressure relief assembly 32 may be identical or different.

For example, the first connecting member 301 includes a riveting structure 3011 and/or a bolt structure 3012, and the first connecting member 301 penetrates through the pressure relief assembly 32 and the first part 331, such that the structure is simple and the implementation is easy. Specifically, the first part 331 may include a plurality of through holes, and correspondingly, the corresponding part of the pressure relief assembly 32 may also be provided with through holes, and the riveting structure 3011 and/or the bolt structure 3012 penetrates through the first part 331 via the through holes of the first part 331, and also penetrates through the part of the pressure relief assembly 32 via the through holes of the pressure relief assembly 32, such that the first part 331 and the pressure relief assembly 32 are fixedly connected. Further, the first connecting member 301 may further include other structures. For example, the first connecting member 301 may further include a gasket 3013 to enhance structural strength and structural stability.

It should be understood that according to the embodiments of the present application, the bolt structure 3012 may be used in conjunction with a nut, such as a blind rivet nut; the riveting structure 3011 may include a rivet or a riveting block. For example, the riveting structure 3011 may be a blind rivet nut, such that the pressure relief assembly 32 is riveted to the first part 331 via the riveting structure 3011. However, the embodiments of the present application are not limited thereto.

In some embodiments, in the case that the first part 331 is provided with a plurality of through holes, notch areas 335 may be provided between the through holes of the first part 331. The first connecting members 301 may not be mounted in the notch areas 335, and the fixed connection requirements of the first connecting member 301 can be substantially ensured. Meanwhile, the weight of the adapting part 33 can be reduced, thus reducing the load on the first wall 31 and extending the service life of the first wall 31.

In some embodiments, the adapting part 33 and the first wall 31 may be fixed by welding or bonding. For example, welding is used for illustration herein. Specifically, the second connecting member 302 includes a weld seam 3021 formed by welding the third part 333 to the first wall 31. The third part 333 and the first wall 31 are fixed by welding, such that the sealing performance and the structural stability between the third part 333 and the first wall 31 can be enhanced. For example, as shown in FIGS. 9 to 12, in the case that the outer contour of the adapting part 33 is rectangular, a rectangular weld seam 3021 is formed between the adapting part 33 and the first wall 31 to enhance the sealing performance between the adapting part 33 and the first wall 31.

Further, the second connecting member 302 includes a sealing member 3022, and the weld seam 3021 is provided with the sealing member 3022. By further sealing the weld seam 3021 with the sealing member, the sealing performance between the adapting part 33 and the first wall 31 can be further enhanced. The sealing member 3022 may be implemented in a variety of ways. For example, the sealing member 3022 may include a sealant, and the sealant may be applied along the weld seam 3021. For example, the sealant may cover the weld seam 3021 to further enhance the sealing performance between the adapting part 33 and the first wall 31.

In some embodiments, as shown in FIGS. 9 to 12, a protruding structure 312 protruding away from the interior of the energy storage device 3 is disposed around the through hole 311 of the first wall 31. In one aspect, the position of the adapting part 33 can be located through the protruding structure 312, thereby facilitating positioning and mounting of the adapting part 33. In another aspect, the protruding structure 312 can also raise the connection interface between the pressure relief assembly 32 and the adapting part 33, thereby enhancing the sealing performance.

Further, as shown in FIGS. 9 to 12, the weld seam 3021 is located at the protruding structure 312. Since the protruding structure 312 is disposed in a protruding manner, the protruding structure 312 is less prone to accumulation of external environmental substances such as rainwater, thereby preventing such substances from affecting the weld seam 3021 and further enhancing the sealing performance at the weld seam 3021.

In the embodiments of the present application, the energy storage device 3 further includes a support structure 34, and the support structure 34 is positioned in alignment with the pressure relief assembly 32 and is disposed on a side of the pressure relief assembly 32 facing the interior of the energy storage device 3. To ensure that the pressure relief assembly 32 can promptly open when the internal temperature or pressure of the energy storage device 3 reaches a predetermined threshold, the structural strength of the pressure relief assembly 32 is typically lower than that of other regions of the first wall 31. Consequently, during normal operation of the energy storage device 3, the pressure relief assembly 32 is more prone to damage, opening, or failure. Therefore, the support structure 34 can support the pressure relief assembly 32 on the side of the pressure relief assembly 32 proximal to the energy storage device 3, such that during normal operation of the energy storage device 3, the risk of collapse or failure of the pressure relief assembly 32 due to excessive external loads is reduced, thereby enhancing the structural strength of the pressure relief assembly 32. Additionally, in the case of thermal runaway within the energy storage device 3, the support structure can mitigate the impact on the actuation of the pressure relief assembly 32, such that the pressure relief assembly 32 can timely reduce the internal temperature or release the internal pressure of the energy storage device 3, thereby improving the reliability of the energy storage device 3.

It should be understood that the position of the support structure 34 according to the embodiments of the present application may be flexibly configured based on actual applications. For example, as shown in FIGS. 9 to 12, the support structure 34 is connected to the inner wall of the through hole 311, and at least a part of the support structure 34 is disposed inside the through hole 311. Since at least a part of the support structure 34 is disposed inside the through hole 311, the space can be saved, and the support structure 34 can be placed closer to the pressure relief assembly 32, thereby enhancing supporting effect of the support structure 34 on the pressure relief assembly 32.

It should be understood that the support structure 34 according to the embodiments of the present application may be implemented in a variety of ways. The number of the support structure 34 may be one or more.

For example, as shown in FIG. 12, the support structure 34 includes at least two intersecting support bars. The intersecting arrangement of at least two support bars enables the at least two support bars to extend in different directions, thereby enhancing structural strength in multiple directions.

In the case that a plurality of support structures 34 are provided, the two intersecting support bars can be connected by methods such as welding, snap-fitting, adhesive bonding, or bolt connection.

For another example, as shown in FIGS. 9 to 12, at least one first support bar 341 extending in the length direction X and at least one second support bar 342 extending in the width direction Y may be provided. In this way, the at least one first support bar 341 and the at least one second support bar 342 intersect with each other and are perpendicular to each other, which can enhance the structural strength in both the length direction X and the width direction Y, thereby improving the overall structural stability of the first wall 31.

For another example, at least two support bars extending in the same direction may be provided, that is, the at least two support bars are parallel to each other, so as to facilitate processing and assembling. However, the embodiments of the present application are not limited thereto.

Figures 13, 14:
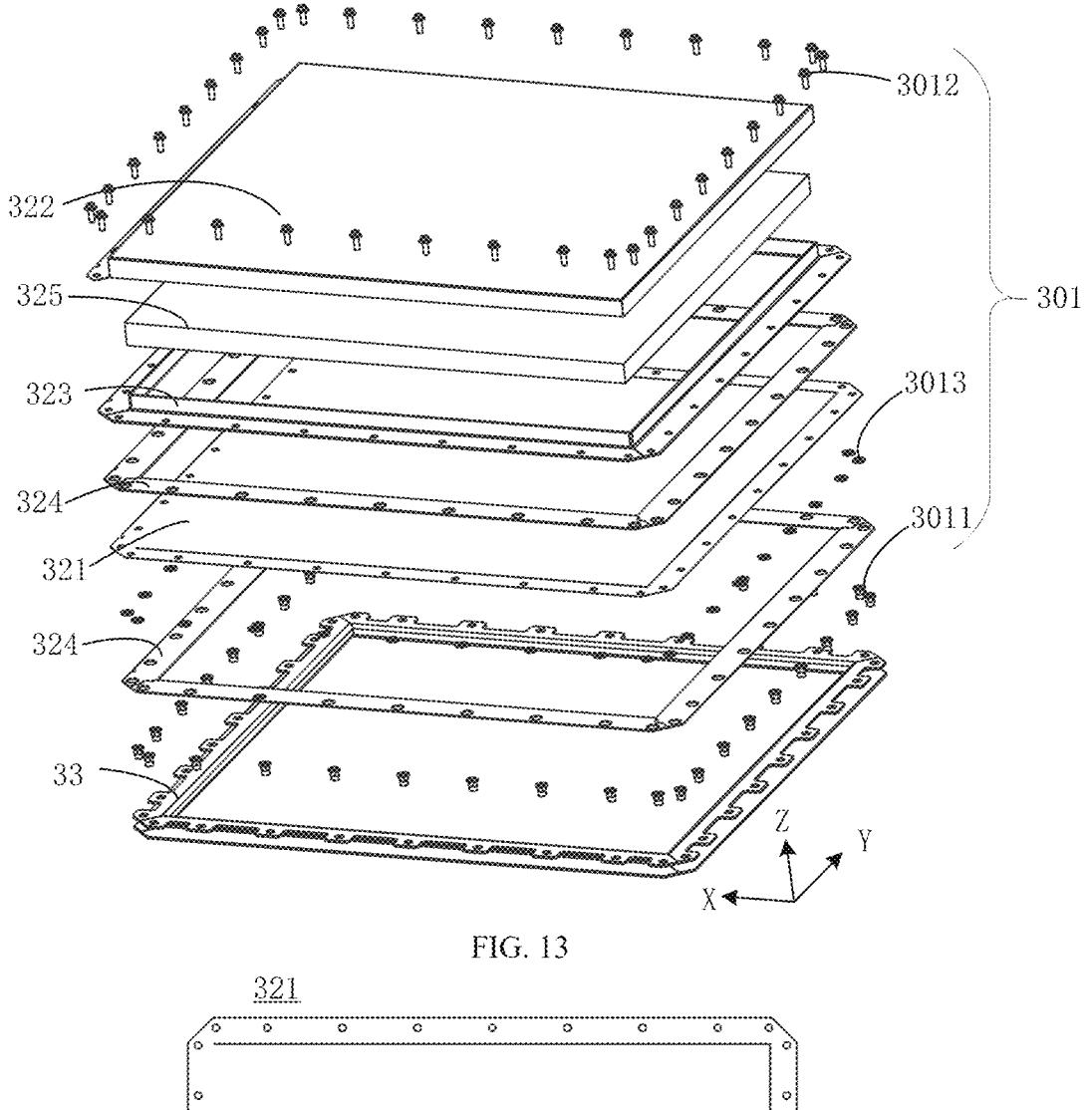
FIG. 13 is a schematic diagram of an exploded structure of a pressure relief assembly and an adapting part according to an embodiment of the present application.
FIG. 14 is a schematic diagram of a pressure relief plate according to an embodiment of the present application.

The pressure relief assembly 32 according to the embodiments of the present application will be described in detail below with reference to the drawings. FIG. 13 illustrates a schematic diagram of an exploded structure of the pressure relief assembly 32 and the adapting part 33 according to the embodiments of the present application. As shown in FIG. 13, the pressure relief assembly 32 according to the embodiments of the present application may include a pressure relief plate 321.

Specifically, FIG. 14 illustrates a schematic diagram from a top view of the pressure relief plate 321 according to the embodiments of the present application. As shown in FIGS. 13 and 14, the pressure relief assembly 32 includes the pressure relief plate 321, and the pressure relief plate 321 is provided with a weakened zone 3211. In this way, when the internal pressure or temperature of the energy storage device 3 reaches a predetermined threshold, the weakened zone 3211 of the pressure relief plate 321 can be easily destroyed, allowing the pressure relief plate 321 to open promptly. The high-temperature and high-pressure emissions within the energy storage device 3 can then be rapidly discharged from the energy storage device 3 through the through hole 311 and the damaged pressure relief plate 321, reducing the risk of explosion of the energy storage device 3 and improving the reliability of the energy storage device 3.

In the embodiments of the present application, an edge region 3212 of the pressure relief plate 321 is connected to the first wall 31, and the weakened zone 3211 is disposed on a side of at least a part of the edge region 3212 of the pressure relief plate 321 proximal to the center of the pressure relief plate 321. Specifically, as shown in FIGS. 13 and 14, the edge region 3212 of the pressure relief plate 321 may be provided with a plurality of through holes, such that the first connecting member 301 penetrates through the pressure relief plate 321 via the through holes of the edge region 3212, thereby fixedly connecting the pressure relief plate 321 to the first wall 31. For example, the pressure relief plate 321 and the adapting part 33 may be fixedly connected via the first connecting member 301, such that the pressure relief plate 321 and the first wall 31 can be fixedly connected indirectly through the fixed connection between the adapting part 33 and the first wall 31. The embodiments of the present application are not limited thereto.

As shown in FIGS. 13 and 14, by disposing the weakened zone 3211 on at least a part of the edge region 3212, when the internal pressure or temperature of the energy storage device 3 reaches a predetermined threshold, at least a part of the edge region 3212 can be destroyed, and the high-temperature and high-pressure emissions within the energy storage device 3 can be promptly discharged through the damaged area. Additionally, since the weakened zone 3211 is disposed on the edge region 3212, the enclosed area defined by the weakened zone 3211 is relatively large, such that when the pressure relief plate 321 is destroyed, a relatively large area is opened by the pressure relief plate 321, and the high-temperature and high-pressure emissions within the energy storage device 3 can be discharged more promptly, thereby further reducing the risk of explosion and improving reliability.

In some embodiments, a part of the edge region 3212 of the pressure relief plate 321 is not provided with the weakened zone 3211. For example, as shown in FIGS. 13 and 14, since a part of the edge region 3212 of the pressure relief plate 321 is not provided with the weakened zone 3211, when the edge region 3212 with the weakened zone 3211 is destroyed, the pressure relief plate 321 opens from the weakened zone 3211, and the edge region 3212 without the weakened zone 3211 can remain connected. Specifically, the pressure relief plate 321 can bend at the edge region 3212 without the weakened zone 3211, allowing the prompt discharge of high-temperature and high-pressure emissions within the energy storage device 3 through the opened area. Additionally, the structural integrity of the pressure relief plate 321 can be maintained as much as possible, and the risk of localized fragmentation of the pressure relief plate 321, which may cause damage to other structures or individuals, is minimized.

It should be understood that the weakened zone 3211 according to the embodiments of the present application may be implemented in a variety of ways. For example, as shown in FIGS. 13 and 14, the weakened zone 3211 includes a score formed on the pressure relief plate 321, the score having an opening facing away from the interior of the energy storage device 3. When the internal pressure or temperature of the energy storage device 3 reaches the predetermined threshold, due to the relatively small thickness at the score, the pressure relief plate 321 is easy to be broken at the score. Additionally, since the opening of the score faces away from the interior of the energy storage device 3, the emissions within the energy storage device 3 can more easily break through the pressure relief plate, such that the pressure relief plate 321 promptly opens to allow the discharge of high-temperature and high-pressure emissions within the energy storage device 3. For another example, the weakened zone 3211 may further include a thermosensitive material or a pressure-sensitive material. For example, at least a part of the pressure relief plate 321 may be provided with the thermosensitive material or the pressure-sensitive material to form the weakened zone 3211. The embodiments of the present application are not limited thereto.

In the embodiments of the present application, the pressure relief plate 321 may further be provided with other structures. For example, as shown in FIGS. 13 and 14, the pressure relief plate 321 may further include a first positioning notch 3213 for positioning during the mounting of the pressure relief plate 321.

It should be understood that the position of the first positioning notch 3213 may be flexibly configured based on actual applications. For example, the first positioning notch 3213 does not pass through the midline of an edge of the pressure relief plate 321 where the first positioning notch 3213 is located. Specifically, as shown in FIGS. 13 and 14, taking a rectangular pressure relief plate 321 as an example, the first positioning notch 3213 may be provided at any one edge. The edge according to the embodiments of the present application refers to any one edge or side line of the pressure relief plate 321. For example, the first positioning notch may be provided at the left side edge, and then the first positioning notch 3213 does not pass through the midline of the edge. For example, the first positioning notch may be provided at a lower end of the left edge as shown in FIGS. 13 and 14. In this way, during the mounting of the pressure relief plate 321, the first positioning notch 3213 may be arranged in a designated position. For example, as shown in FIGS. 13 and 14, the first positioning notch 3213 can be identified visually by installation personnel or intelligently identified by an installation device, such that the first positioning notch 3213 is provided at the lower end of the left side edge instead of other positions when being mounted, thereby minimizing the risk of incorrect mounting the two opposite side surfaces of the pressure relief plate 321. For example, in the case that the first positioning notch 3213 is incorrectly mounted at the upper end of the left side edge, the two side surfaces of the pressure relief plate 321 are incorrectly mounted. For example, the opening of the score of the pressure relief plate 321 is typically required to face the exterior of the energy storage device 3, such that by using the first positioning notch 3213, the risk of incorrectly orienting the opening of the score of the pressure relief plate 321 can be minimized, thereby improving mounting efficiency.

For another example, the first positioning notch 3213 is provided in the edge region 3212 of the pressure relief plate 321 where the weakened zone 3211 is not provided. By positioning the edge region 3212 where the weakened zone 3211 is not provided through the first positioning notch 3213, the position of the weakened zone 3211 on the pressure relief plate 321 can also be determined. This allows the pressure relief plate 321 to open in a specific direction when destroyed, enabling the emissions within the energy storage device 3 to be discharged in a specific direction, thereby reducing the impact of the high-temperature and high-pressure emissions on the external environment.

Figure 15:
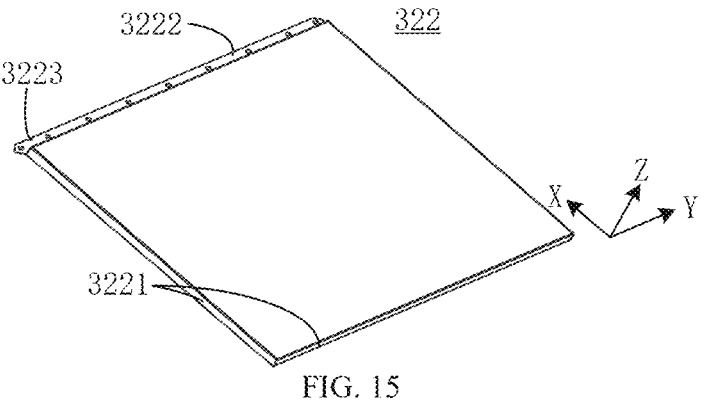
FIG. 15 is a schematic structural diagram of a cover according to an embodiment of the present application.
Figure 16:
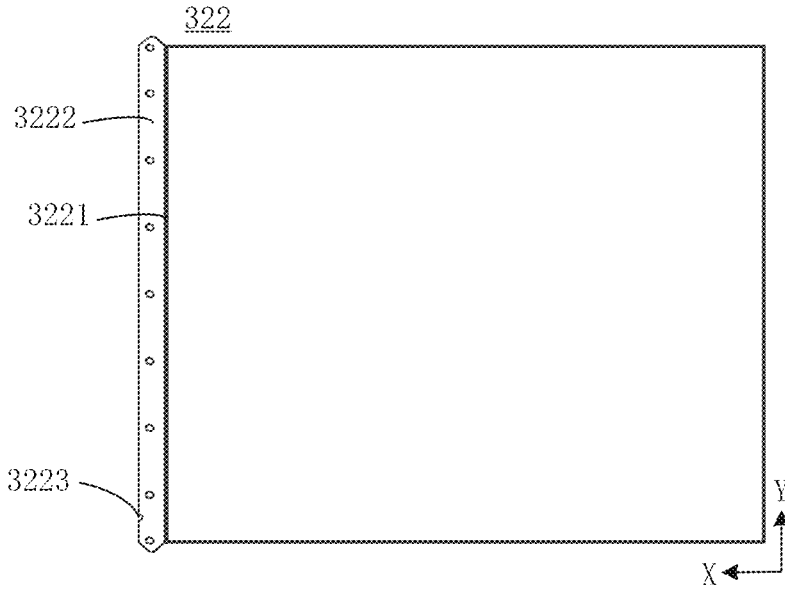
FIG. 16 is a schematic diagram from a top view of a cover according to an embodiment of the present application.
Figure 17:
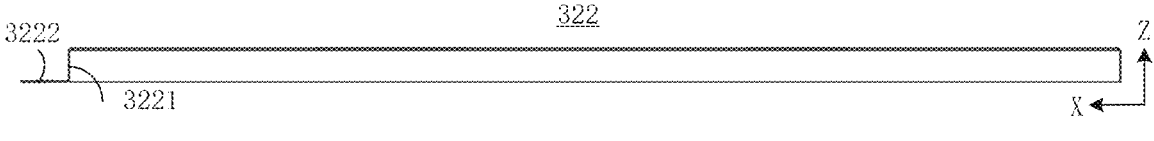
FIG. 17 is a schematic diagram from a side view of a cover according to an embodiment of the present application.

It should be understood that, as shown in FIGS. 13 and 14, the pressure relief assembly 32 according to the embodiments of the present application may further include a cover 322. FIG. 15 illustrates a schematic structural diagram of the cover 322 according to the embodiments of the present application. FIG. 16 illustrates a schematic diagram from a top view of the cover 322 according to the embodiments of the present application. FIG. 17 illustrates a schematic diagram from a side view of the cover 322 according to the embodiments of the present application. The cover 322 shown in FIGS. 15 to 17 may be the cover 322 included in the pressure relief assembly 32 shown in FIG. 13.

As shown in FIGS. 15 to 17, the pressure relief assembly 32 includes a cover 322, the cover 322 being disposed on the side of the pressure relief plate 321 distal to the interior of the energy storage device 3, and covering the pressure relief plate 321. Since the structural strength of the pressure relief plate 321 is insufficient, providing the cover 322 on the side of the pressure relief plate 321 distal to the interior of the energy storage device 3 can protect the pressure relief plate 321, reduce the impact of the external environment of the energy storage device 3 on the pressure relief plate 321, and enhance the stability of the pressure relief plate 321 during normal operation of the energy storage device 3, thereby minimizing the risk of premature failure of the pressure relief plate 321.

The structure of the cover 322 according to the embodiments of the present application may be flexibly configured based on actual applications. For example, as shown in FIGS. 15 to 17, the cover 322 is a groove structure with an opening facing the pressure relief plate 321, a part of a side wall 3221 of the cover 322 is provided with an extending part 3222, the extending part 3222 extends from an end part of the side wall 3221 proximal to the opening to a direction away from the side wall 3221, and the extending part 3222 is configured to connect the side wall 3221 of the cover 322 and the first wall 31. The extending part 3222 is provided on a part of the side wall 3221 of the cover 322, and the cover is fixed to the first wall 31 via the extending part 3222, such that a part of the side wall 3221 of the cover 322 is fixed to the first wall 31, while the other part of the side wall 3221 is not fixed to the first wall 31. In this way, during normal operation of the energy storage device 3, under the force of gravity, the cover 322 can cover the surface of the pressure relief plate 321 to protect the pressure relief plate 321. In the case that thermal runaway of the batteries 10 inside the energy storage device 3 occurs, the pressure relief plate 321 is destroyed, and the emissions within the energy storage device 3 are discharged through the pressure relief plate 321, and then promptly discharged to the exterior of the energy storage device 3 through the area of the side wall 3221 of the cover 322 that is not fixed to the first wall 31, thereby minimizing the risk of explosion of the energy storage device 3.

For example, in the case of a rectangular cover 322, the extending part 3222 may be disposed on a side of the cover 322, such that the side of the cover 322 where the extending part 3222 is provided is fixed to the first wall 31. Then, when thermal runaway of the batteries 10 inside the energy storage device 3 occurs, the pressure relief plate 321 is destroyed, and after emissions within the energy storage device 3 are discharged through the pressure relief plate 321, the three side walls 3221 of the cover 322 where the extending part 3222 is not provided may be separated from the first wall 31 under the effect of the emissions. For example, the cover 322 may be bent in the region of the extending part 3222, such that the cover 322 is opened to promptly discharge the emissions, thereby minimizing the risk of explosion of the energy storage device 3.

It should be understood that the extending part 3222 according to the embodiments of the present application may be configured to connect the cover 322 and the first wall 31. For example, the extending part 3222 is connected to the first wall 31 via the first connecting member 301. Specifically, the extending part 3222 is connected to a part of the side wall 3221 of the cover 322, the extending part 3222 may be provided with a plurality of through holes, and the first connecting member 301 penetrates through the through holes of the extending part 3222 to fix the extending part 3222 and the first wall 31 to each other. For example, the first connecting member 301 may respectively penetrate through the adapting part 33 and the extending part 3222 to allow the adapting part 33 and the extending part 3222 to be connected and fixed to each other, such that the structure is simple and the implementation is easy. In addition, since the adapting part 33 is connected to the first wall 31, the extending part 3222 is indirectly connected to the first wall 31. However, the embodiments of the present application are not limited thereto.

In the embodiments of the present application, as shown in FIGS. 15 to 17, the extending part 3222 is positioned in alignment with a side of the pressure relief plate 321 where the weakened zone 3211 is not provided. In this way, when the internal pressure or temperature of the energy storage device 3 reaches a predetermined threshold, the opening direction of the pressure relief plate 321 aligns with the opening direction of the cover 322, reducing obstruction to the emissions. Therefore, the emissions within the energy storage device 3 can be rapidly and smoothly discharged from the energy storage device 3, thereby improving the reliability of the energy storage device 3.

In some embodiments, the extending part 3222 is provided with a second positioning notch 3223, and the second positioning notch 3223 is arranged in alignment with the first positioning notch 3213, such that the positioning of the extending part 3222 relative to the pressure relief plate 321 can be achieved. For example, in the case that the first positioning notch 3213 is provided on a side of the pressure relief plate 321 where the weakened zone 3211 is not provided, the extending part 3222 can be disposed in alignment with the side of the pressure relief plate 321 where the weakened zone 3211 is not provided through the second positioning notch 3223, thereby improving the mounting efficiency.

Figure 18:
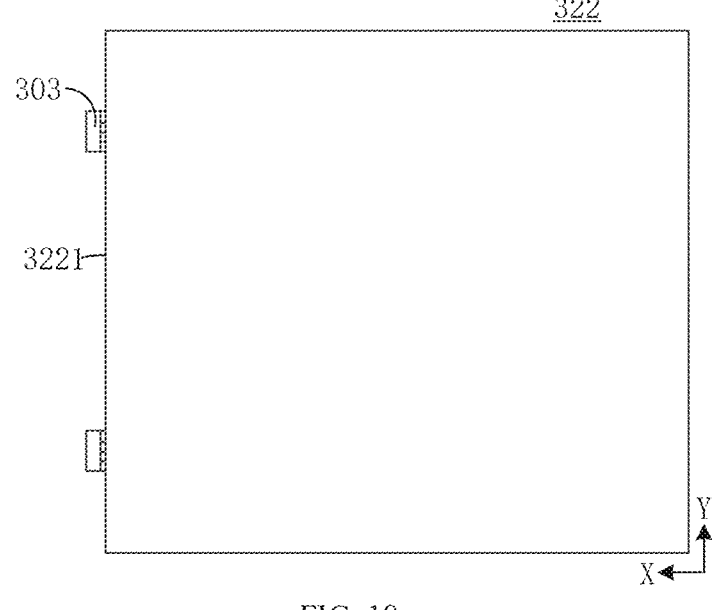
FIG. 18 is a schematic diagram from a top view of a cover according to another embodiment of the present application.

It should be understood that the cover 322 may be connected to the first wall 31 through the extending part 3222 or by other means. For example, FIG. 18 illustrates another schematic diagram from a top view of the cover 322 according to the embodiments of the present application. As shown in FIG. 18, the cover 322 is a groove structure with an opening facing the pressure relief plate 321, and a part of the side wall 3221 of the cover 322 is rotatably connected to the first wall 31 via a third connecting member 303. Specifically, unlike the solution of disposing the extending part 3222 on the side wall 3221 of the cover 322, the rotatable connection between the side wall 3221 of the cover 322 and the first wall 31 can be achieved via the third connecting member 303. In this way, during normal operation of the energy storage device 3, under the force of gravity, the cover 322 can cover the surface of the pressure relief plate 321 to protect the pressure relief plate 321. In the case that thermal runaway of the batteries 10 inside the energy storage device 3 occurs, the pressure relief plate 321 is destroyed, and the emissions within the energy storage device 3 are discharged through the pressure relief plate 321. Subsequently, the cover 322, by rotating through the third connecting member 303 disposed on the side wall 3221, opens to allow the emissions to be promptly discharged to the exterior of the energy storage device 3, thereby minimizing the risk of explosion of the energy storage device 3.

It should be understood that the third connecting member 303 according to the embodiments of the present application may be flexibly configured based on actual applications. For example, the third connecting member 303 may include a hinge to achieve a rotatable connection. In particular, a part of the hinge is connected to the side wall 3221 of the cover 322, and the other part of the hinge is connected to the adapting part 33 or the first wall 31, such that the cover 322 and the first wall 31 can rotate relatively under the action of the hinge. For another example, a plurality of third connecting member 303 may be disposed on one side of the cover 322 to stabilize the structure of the cover 322. The embodiments of the present application are not limited thereto.

For ease of description, the embodiments of the present application are mainly described in detail by taking an embodiment in which the cover 322 includes the extending part 3222 as an example.

Figure 19:
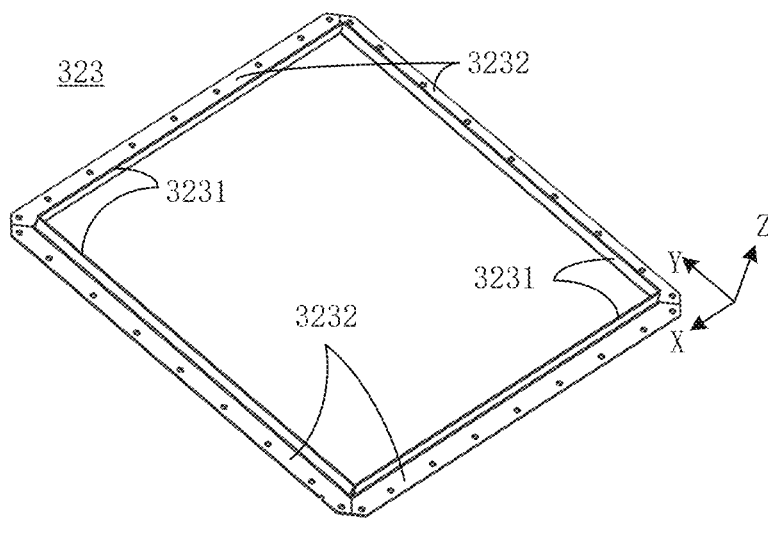
FIG. 19 is a schematic structural diagram of a peripheral structure according to an embodiment of the present application.
Figure 20:
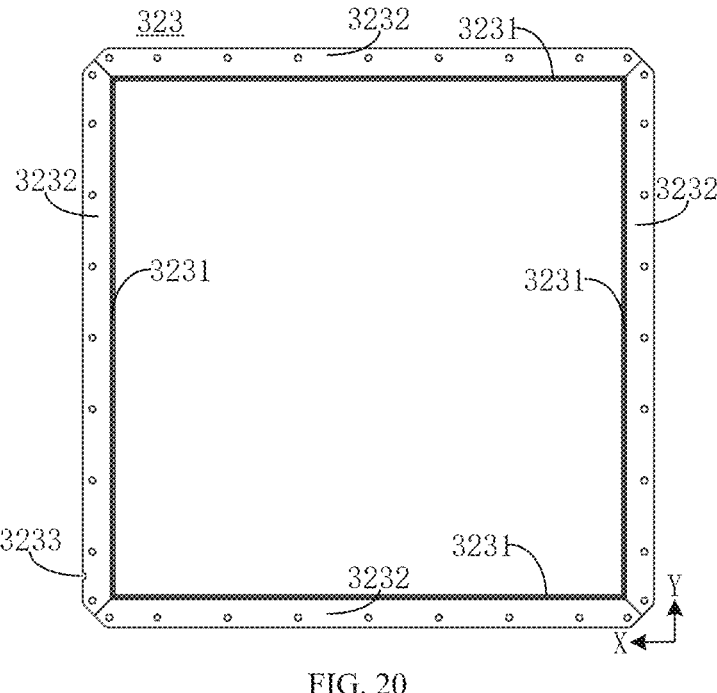
FIG. 20 is a schematic diagram from a top view of a peripheral structure according to an embodiment of the present application.
Figure 21:
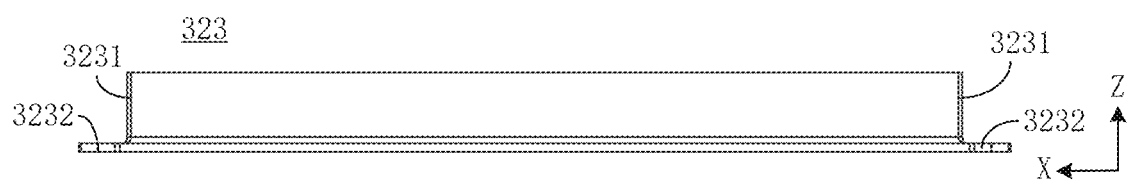
FIG. 21 is a schematic diagram from a side view of a peripheral structure according to an embodiment of the present application.

It should be understood that the pressure relief assembly 32 according to the embodiments of the present application may further include a peripheral structure 323. FIG. 19 illustrates a schematic structural diagram of the peripheral structure 323 according to the embodiments of the present application. FIG. 20 illustrates a schematic diagram from a top view of the peripheral structure 323 according to the embodiments of the present application. FIG. 21 illustrates a schematic diagram from a side view of the peripheral structure 323 according to the embodiments of the present application. The peripheral structure 323 shown in FIGS. 19 to 21 may be the peripheral structure 323 included in the pressure relief assembly 32 shown in FIG. 13.

As shown in FIGS. 19 to 21, the pressure relief assembly 32 includes the peripheral structure 323 arranged around the periphery of the cover 322, and the peripheral structure 323 includes a fourth part 3231 and a fifth part 3232 that are connected and oppositely bent, the fourth part 3231 being disposed inside the groove structure, and the fifth part 3232 being disposed between the extending part 3222 and the first wall 31 and being connected to the first wall 31.

With reference to FIGS. 9 and 10, since a part of the cover 322 is not directly connected to the first wall 31 or the adapting part 33, a gap exists between the periphery of the cover 322 and the first wall 31 or the adapting part 33. Substances from the external environment may enter the interior of the energy storage device 3 through the gap, thereby affecting the internal components of the energy storage device 3. For example, rainwater may enter the energy storage device 3 and impact the pressure relief assembly 32. Therefore, the peripheral structure 323 may be provided around the periphery of the cover 322, and the peripheral structure 323 includes the fourth part 3231 and the fifth part 3232 that are oppositely bent. The peripheral structure 323 can encircle the periphery of the cover 322 to reduce the ingress of substances from external environment into the interior of the energy storage device 3 through the peripheral gap of the cover 322. For example, the peripheral structure can effectively reduce the ingress of rainwater into the energy storage device 3, thereby protecting the internal components of the energy storage device 3 and improving the reliability and sealing performance of the energy storage device 3.

It should be understood that the peripheral structure 323 according to the embodiments of the present application may be an annular structure to encircle the periphery of the cover 322, such that the peripheral structure 323 is disposed between each region of the periphery of the cover 322 and the first wall 31 or the adapting part 33 to enhance the overall sealing performance.

In some embodiments, the fifth part 3232 is disposed between the extending part 3222 and the first wall 31, and specifically, the fifth part 3232 and the first wall 31 may be stacked. For example, the fifth part 3232 may be arranged in a stacked manner with the adapting part 33; for another example, the fifth part 3232 may be arranged in a stacked manner with the first part 331 of the adapting part 33; for still another example, the extending part 3222 of the cover 322, the fifth part 3232, the pressure relief plate 321, and the first part 331 of the adapting part 33 may be stacked in sequence and connected via the first connecting member 301. In addition, since the adapting part 33 is fixedly connected to the first wall 31, the fifth part 3232 may be indirectly connected to the first wall 31.

In some embodiments, the pressure relief plate 321 is provided with the first positioning notch 3213, the peripheral structure 323 is provided with a third positioning notch 3233, and the third positioning notch 3233 is arranged in alignment with the first positioning notch 3213. In one aspect, the third positioning notch 3233 of the peripheral structure 323 can be configured to position the mounting position of the peripheral structure 323, thus improving mounting efficiency. In another aspect, the third positioning notch 3233 also can correspond to other positioning structures, for example, enabling other positioning structures to be arranged in alignment with the first positioning notch 3213 via the third positioning notch 3233, thereby positioning other structures and improving the mounting efficiency of the pressure relief assembly 32.

For example, the first positioning notch 3213, the third positioning notch 3233, and the second positioning notch 3223 of the cover 322 are arranged in alignment with each other, thereby enabling mutual positioning among the pressure relief plate 321, the cover 322, and the peripheral structure 323, which in turn improves the mounting efficiency of the pressure relief assembly 32.

Figure 22:
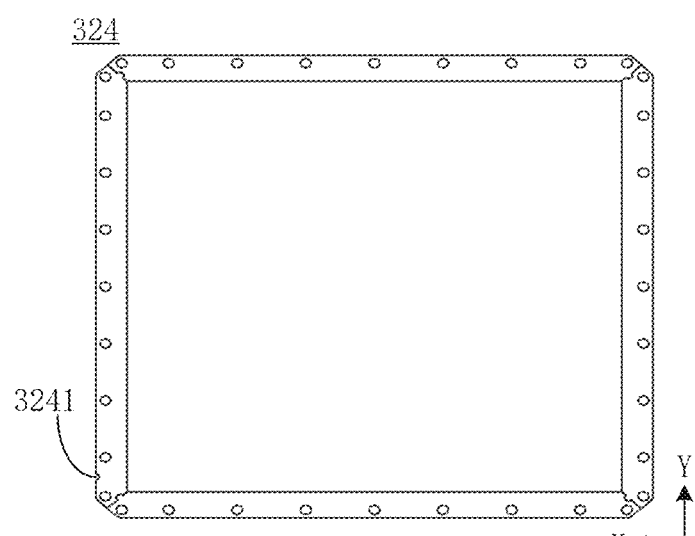
FIG. 22 is a schematic diagram from a top view of a sealing structure according to an embodiment of the present application.

It should be understood that the pressure relief assembly 32 according to the embodiments of the present application may further include a sealing structure 324. FIG. 22 illustrates a schematic diagram from a top view of the sealing structure 324 according to the embodiments of the present application. The sealing structure 324 shown in FIG. 22 may be any one of the at least two sealing structures 324 included in the pressure relief assembly 32 shown in FIG. 13.

In some embodiments, the pressure relief assembly 32 may include the sealing structure 324, and the sealing structure 324 is at least disposed on the edge region 3212 of the pressure relief plate 321, thereby enhancing the sealing performance of the pressure relief assembly 32.

As shown in FIG. 22, the pressure relief assembly 32 includes two layers of sealing structures 324, at least parts of the two layers of sealing structures 324 being respectively disposed on two sides of the edge region 3212 of the pressure relief plate 321. That is, the pressure relief plate 321 is clamped between the two layers of sealing structures 324, so as to enhance the sealing performance of the two sides of the pressure relief plate 321.

Specifically, each layer of the sealing structures 324 may be provided with a plurality of through holes, and the first connecting member 301 may sequentially penetrate through the through holes of the two layers of sealing structures 324, thereby connecting the two layers of sealing structures 324 to the first wall 31. For another example, the first connecting member 301 may sequentially penetrate through the through holes of the two layers of sealing structures 324, thereby connecting the two layers of sealing structures 324 to the adapting part 33. For another example, the extending part 3222 of the cover 322, the fifth part 3232, one layer of sealing structure 324, the pressure relief plate 321, another layer of sealing structure 324, and the first part 331 of the adapting part 33 may be stacked in sequence, and the first connecting member 301 sequentially penetrates through each structure layer to achieve mutual connection. In addition, since the adapting part 33 is fixedly connected to the first wall 31, the two layers of sealing structures 324 are connected to the adapting part 33, i.e., indirectly connected to the first wall 31.

It should be understood that the shape and size of the sealing structure 324 according to the embodiments of the present application may be flexibly configured based on actual applications. For example, the two layers of sealing structures 324 may have the same shape or different shapes; and the two layers of sealing structures 324 may have the same size or different sizes. For another example, the two layers of sealing structures 324 may be configured to have the same shape and size to facilitate processing.

For another example, as shown in FIG. 22, the two layers of sealing structures 324 are each annular, and arranged to encircle the edge region 3212 of the pressure relief plate 321. This configuration can reduce the impact of the sealing structure 324 on the central area of the pressure relief plate 321, allowing the pressure relief plate 321 to open promptly when the internal pressure or temperature of the energy storage device 3 reaches a predetermined threshold, thereby releasing the internal pressure or reducing internal temperature.

In some embodiments, the sealing structure 324 may cover the weakened zone 3211, such that the sealing structure 324 can protect the weakened zone 3211 to reduce the impact of other components on the weakened zone 3211.

In some embodiments, the sealing structure 324 may further be provided with a fourth positioning notch 3241, and the fourth positioning notch 3241 may be arranged in alignment with the first positioning notch 3213 to position the sealing structure 324. In addition, the first positioning notch 3213, the third positioning notch 3233, the second positioning notch 3223, and the fourth positioning notch 3241 may be arranged in alignment with each other, thereby enabling mutual positioning among the corresponding pressure relief plate 321, the cover 322, the peripheral structure 323, and the sealing structure 324, which in turn improves the mounting efficiency of the pressure relief assembly 32.

In the embodiments of the present application, the pressure relief plate 321 may further include other structures. For example, a filling structure 325 is provided between the cover 322 and the pressure relief plate 321. In one aspect, the filling structure 325 can enhance the sealing performance and the structural stability between the cover 322 and the pressure relief plate 321. In another aspect, in the case that substances from external environment enter the interior of the energy storage device 3 through the gap between the cover 322 and the first wall 31, the filling structure 325 can also exhibit some absorption properties. For example, if rainwater enters the interior of the energy storage device 3 through the gap between the cover 322 and the first wall 31, the filling structure 325 can absorb some of the rainwater, preventing damage to the internal components of the energy storage device 3.

It should be understood that the material of the filling structure 325 may be flexibly configured based on actual applications. For example, the material of the filling structure 325 includes at least one of the following: rock wool, flame-retardant polyurethane foam, glass wool, and phenolic foam.

The use of flame-retardant materials can also minimize heat diffusion and combustion in the case of thermal runaway of the batteries 10 inside the energy storage device 3, thereby minimizing the risk of explosion of the energy storage device 3. When rock wool is used, in order to improve processing efficiency, the rock wool may be wrapped with a material such as aluminum foil before being disposed between the cover 322 and the pressure relief plate 321.

In some embodiments, the filling structure may be a thermal insulating material for maintaining the internal temperature of the energy storage device 3.

Therefore, in the embodiments of the present application, a plurality of batteries 10 are stored inside the energy storage device 3, and the first wall 31 of the energy storage device 3 is provided with the pressure relief assembly 32. In this way, when at least one battery 10 inside the energy storage device 3 undergoes thermal runaway, causing the pressure or temperature inside the energy storage device 3 to rise and reach a predetermined threshold, the pressure relief assembly 32 is actuated to release the internal pressure or reduce the internal temperature of the energy storage device 3, such that the reliability of the energy storage device 3 is improved. In another aspect, the risk of heat diffusion among the plurality of batteries 10 inside the energy storage device 3 can be reduced.

The pressure relief assembly 32 according to the embodiments of the present application may include a multi-layer structure to cover the through hole 311 of the first wall 31, and is connected and fixed to the first wall 31 via the adapting part 33. Specifically, along the height direction Z of the energy storage device 3, from the exterior to the interior of the energy storage device 3, the pressure relief assembly 32 may sequentially include the cover 322, the filling structure 325, the sealing structure 324, the pressure relief plate 321, and another lay of sealing structure 324. Further, the interior of the through hole 311 of the first wall 31 may further be provided with at least a part of the support structure 34. In this way, the pressure relief assembly 32 remains structurally stable during normal operation of the energy storage device 3, thereby reducing the risk of failure. When the internal pressure or temperature of the energy storage device 3 rises and reaches a predetermined threshold, the pressure relief assembly 32 can open promptly to release the internal pressure or reduce the internal temperature of the energy storage device 3, thereby minimizing the risk of explosion of the energy storage device 3.

Although the present application has been described with reference to preferred embodiments, various modifications can be made and components can be replaced with equivalents without departing from the scope of the present application. In particular, the technical features mentioned in the embodiments may be combined in any manner as long as there are no structural conflicts. The present application is not limited to the specific embodiments disclosed herein, but encompasses all technical solutions falling within the scope of the claims.

What is claimed is:

1. An energy storage device, wherein the energy storage device is used for storing a plurality of batteries, and comprises:
   a first wall; and
   a pressure relief assembly disposed on the first wall;
   wherein an adapting part is disposed around a through hole of the first wall, the adapting part being configured to connect the first wall and the pressure relief assembly;
   wherein the adapting part defines an accommodating space, the adapting part and the pressure relief assembly being connected via a first connecting member, and the accommodating space is configured to accommodate at least a part of the first connecting member.

2. The energy storage device according to claim 1, wherein the adapting part comprises a groove, the accommodating space is formed inside the groove, and the opening of the groove faces away from the center of the through hole.

3. The energy storage device according to claim 1, wherein the adapting part and the first wall are of an integrated structure; and/or the adapting part and the first wall are separately arranged, and the adapting part and the first wall are connected via a second connecting member.

4. The energy storage device according to claim 3, wherein the adapting part comprises a first part, a second part, and a third part, the second part is configured to connect the first part and the third part arranged opposite to each other, and the first part, the second part, and the third part are configured to define, in an enclosing manner, an accommodating space;
   the first part is connected to the pressure relief assembly via the first connecting member, and the accommodating space is configured to accommodate at least a part of the first connecting member;
   the third part is connected to the first wall via the second connecting member.

5. The energy storage device according to claim 4, wherein the second connecting member comprises a weld seam formed by welding the third part to the first wall; and/or the second connecting member comprises a sealing member, and the weld seam is provided with the sealing member.

6. The energy storage device according to claim 5, wherein a protruding structure protruding away from the interior of the energy storage device is disposed around the through hole of the first wall; and/or the weld seam is located at the protruding structure.

7. The energy storage device according to claim 1, wherein the energy storage device further comprises a support structure, and the support structure is positioned in alignment with the pressure relief assembly and is disposed on a side of the pressure relief assembly facing the interior of the energy storage device; optionally, the support structure is connected to the inner wall of the through hole, and at least a part of the support structure is disposed inside the through hole; and/or the support structure comprises at least two intersecting support bars.

8. The energy storage device according to claim 1, wherein the pressure relief assembly comprises a pressure relief plate, and the pressure relief plate is provided with a weakened zone.

9. The energy storage device according to claim 8, wherein an edge region of the pressure relief plate is connected to the first wall, and the weakened zone is disposed on a side of at least a part of the edge region of the pressure relief plate proximal to the center of the pressure relief plate; and/or the weakened zone comprises a score formed on the pressure relief plate, the score having an opening facing away from the interior of the energy storage device.

10. The energy storage device according to claim 8, wherein the pressure relief assembly comprises a cover, the cover being disposed on a side of the pressure relief plate distal to the interior of the energy storage device, and covering the pressure relief plate; optionally, the cover is a groove structure with an opening facing the pressure relief plate, a part of a side wall of the cover is provided with an extending part, the extending part extends from an end part of the side wall proximal to the opening to a direction away from the side wall, and the extending part is configured to connect the side wall and the first wall.

11. The energy storage device according to claim 10, wherein the extending part is positioned in alignment with a side of the pressure relief plate where the weakened zone is not provided; and/or the extending part and the first wall are connected via the first connecting member.

12. The energy storage device according to claim 10, wherein the pressure relief assembly comprises a peripheral structure arranged around the periphery of the cover, and the peripheral structure comprises a fourth part and a fifth part that are connected and oppositely bent, the fourth part being disposed inside the groove structure, and the fifth part being disposed between the extending part and the first wall and being connected to the first wall.

13. The energy storage device according to claim 12, wherein the pressure relief plate is provided with a first positioning notch, the extending part is provided with a second positioning notch, and the second positioning notch is arranged in alignment with the first positioning notch; and/or the peripheral structure is provided with a third positioning notch, and the third positioning notch is arranged in alignment with the first positioning notch.

14. The energy storage device according to claim 13, wherein the first positioning notch does not pass through the midline of an edge of the pressure relief plate where the first positioning notch is located and/or the first positioning notch is provided in the edge region of the pressure relief plate where the weakened zone is not provided.

15. The energy storage device according to claim 10, wherein the cover is a groove structure with an opening facing the pressure relief plate, and a part of the side wall of the cover is rotatably connected to the first wall via a third connecting member; and/or the pressure relief assembly comprises two layers of sealing structures, at least parts of the two layers of sealing structures being respectively disposed on two sides of the edge region of the pressure relief plate.

16. The energy storage device according to claim 10, wherein a filling structure is provided between the cover and the pressure relief plate; wherein a material of the filling structure comprises at least one of the following: rock wool, flame-retardant polyurethane foam, glass wool, and phenolic foam.

17. The energy storage device according to claim 1, wherein the first wall is a top wall of the energy storage device; wherein a surface of the top wall facing away from the interior of the energy storage device is inclined from the central region of the surface toward the edge region of the surface in the direction of gravity.

* * * * *